|| US008783063B2

(12) United States Patent
Osakabe et al.

(10) Patent No.: US 8,783,063 B2
(45) Date of Patent: Jul. 22, 2014

(54) GLASS SUBSTRATE FOR MAGNETIC DISK AND MANUFACTURING METHOD OF THE SAME

(75) Inventors: Kinobu Osakabe, Tokyo (JP); Hideki Isono, Tokyo (JP); Katsuyuki Iwata, Tokyo (JP); Shinji Eda, Tokyo (JP); Kenichiro Terada, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/349,495

(22) Filed: Jan. 12, 2012

(65) Prior Publication Data

US 2012/0135153 A1     May 31, 2012

Related U.S. Application Data

(62) Division of application No. 12/665,623, filed as application No. PCT/JP2008/067489 on Sep. 26, 2008, now Pat. No. 8,119,267.

(30) Foreign Application Priority Data

Sep. 28, 2007 (JP) ................. 2007-255139
Sep. 28, 2007 (JP) ................. 2007-255319
Dec. 5, 2007 (JP) ................. 2007-314521

(51) Int. Cl.
*C03B 9/14* (2006.01)
*B05C 3/00* (2006.01)
*G11B 5/73* (2006.01)
*C03C 21/00* (2006.01)
*G11B 17/08* (2006.01)

(52) U.S. Cl.
CPC ............ *G11B 5/7315* (2013.01); *C03C 21/002* (2013.01)
USPC ........ 65/30.14; 428/846; 428/848.8; 427/127

(58) Field of Classification Search
USPC ........ 73/11.01, 32 A, 36, 762, 790, 800, 104, 73/783, 794, 806, 862.07; 65/30.14, 90; 501/69, 79, 10, 7, 100; 428/846.9, 141, 428/848, 848.9; 360/135; 438/769; 427/127, 129, 130, 399
See application file for complete search history.

(56) References Cited

U.S. PATENT DOCUMENTS 5,733,622 A     3/1998    Starcke et al.
6,184,162 B1    2/2001    Speit et al.
(Continued)

FOREIGN PATENT DOCUMENTS

JP        9-27150 A     1/1997
JP      11302032 A    11/1999
(Continued)

OTHER PUBLICATIONS

Translation (machine translation), Central Glass JP 2002003241, Jan. 2002.*

(Continued)

*Primary Examiner* — Kevin M. Bernatz
*Assistant Examiner* — Louis Falasco
(74) *Attorney, Agent, or Firm* — Sughrue Mion, PLLC

(57) ABSTRACT

A glass substrate for a magnetic disk of the invention is a disk-shaped glass substrate for a magnetic disk where the substrate has a main surface and end face and is subjected to chemical reinforcement treatment, and is characterized in that the penetration length in the uppermost-portion stress layer on the main surface is 49.1 µm or less, and that assuming that an angle between the main surface and compressive stress in the stress profile by a Babinet compensator method is θ, a value y of $\{12 \cdot t \cdot \ln(\tan \theta) + (49.1/t)\}$ is the penetration length in the uppermost-portion stress layer or less.

17 Claims, 5 Drawing Sheets

(56) References Cited

U.S. PATENT DOCUMENTS

| | | | |
|---|---|---|---|
| 6,245,411 | B1 | 6/2001 | Goto et al. |
| 7,566,673 | B2 | 7/2009 | Kawai |
| 2002/0193233 | A1 | 12/2002 | Kishimoto et al. |
| 2003/0164005 | A1 | 9/2003 | Saito et al. |
| 2003/0172677 | A1 | 9/2003 | Miyamoto et al. |
| 2006/0216552 | A1* | 9/2006 | Ikenishi et al. ............ 428/846.9 |
| 2007/0060465 | A1* | 3/2007 | Varshneya et al. ........... 65/30.14 |
| 2007/0180919 | A1* | 8/2007 | Rosakis et al. .................. 73/760 |
| 2007/0264533 | A1* | 11/2007 | Tsuda et al. ............... 428/846.9 |
| 2008/0053152 | A1* | 3/2008 | Kurachi et al. .............. 65/30.14 |
| 2008/0241603 | A1 | 10/2008 | Isono |

FOREIGN PATENT DOCUMENTS

| | | |
|---|---|---|
| JP | 2000-264681 A | 9/2000 |
| JP | 2001236634 A | 8/2001 |
| JP | 2002003241 A | 1/2002 |
| JP | 2002-100031 A | 4/2002 |
| JP | 2002-348141 A | 12/2002 |
| JP | 2005302289 A | 10/2005 |
| JP | 2006277798 A | 10/2006 |
| JP | 2007-118174 A | 5/2007 |
| JP | 2007234218 A | 9/2007 |
| WO | 2005/093720 A1 | 10/2005 |

OTHER PUBLICATIONS

Japanese Office Action corresponding to Japanese Patent Application no. 2008-248140, dated Apr. 17, 2012. language translation.
Japanese Office Action corresponding to Japanese Patent Application No. 2007-314521, dated Jul. 3, 2012. English language translation.
Japanese Office Action corresponding to Japanese Patent Application No. 2008-248140, dated Sep. 4, 2012. language English translation.
Japanese Office Action corresponding to Japanese Patent Application No. 2012-221077, dated Apr. 25, 2013. language translation.

* cited by examiner

GLASS SUBSTRATE FOR MAGNETIC DISK AND MANUFACTURING METHOD OF THE SAME

This is a divisional of application Ser. No. 12/665,623 filed Mar. 1, 2010. The entire disclosure of the prior application, application Ser. No. 12/665,623, as well as the content of the National Stage of International Application No. PCT/JP2008/067489 filed on Sep. 26, 2008, claiming priority based on Japanese Patent Application Nos. 2007-255139, filed Sep. 28, 2007, 2007-255319 filed Sep. 28, 2007, and 2007-314521 filed Dec. 5, 2007, the contents of all of which are incorporated herein by reference in their entirety.

TECHNICAL FIELD

The present invention relates to a glass substrate for a magnetic disk installed in a hard disk drive apparatus and a manufacturing method of the glass substrate.

BACKGROUND ART

There are magnetic disks as magnetic recording media installed in a hard disk drive apparatus (HDD apparatus). The magnetic disk is manufactured by depositing a NiP film on a metal substrate made of an aluminium-magnesium alloy or the like, or applying a magnetic layer and protective layer onto a glass substrate or ceramic substrate. Conventionally, as a substrate for the magnetic disk, aluminum alloy substrates have widely been used. In recent years, with reductions in size and thickness and high-density recording in the magnetic disk, glass substrates have been used which are more excellent in flatness of the surface and strength in the thin plate as compared with the aluminum alloy substrate (Japanese Laid-Open Patent Publication No. H09-27150).

In recent years, in the magnetic disk installed in the HDD apparatus, the storage capacity will further increase in the future, and it has been required to further increase the recording speed and readout speed of the information in the HDD apparatus. Then, to meet these requirements, it is required to rotate the magnetic disk at higher speed.

However, when the magnetic disk is rotated at high speed in the HDD apparatus, a heavy load is imposed on the magnetic disk, and high strength (impact resistance) is required for the magnetic disk. Further, in recent years, since the HDD apparatus has been used in portable apparatuses such as, for example, notebook PCs, cellular telephones and portable music players, the magnetic disk is required to have high impact resistance such that the disk is not broken when the portable apparatus is dropped. Thus, required are magnetic disks (substrates for the magnetic disk) meeting impact resistance higher than currently required impact resistance.

DISCLOSURE OF INVENTION

The present invention was made in view of the aforementioned respect, and it is an object of the invention to provide a glass substrate for a magnetic disk meeting impact resistance higher than currently required impact resistance.

A glass substrate for a magnetic disk of the invention is a disk-shaped glass substrate for a magnetic disk where the substrate has a main surface and end face and is subjected to chemical reinforcement treatment, and is characterized in that the penetration length in the uppermost-portion stress layer on the main surface is 49.1 µm or less, and that assuming that an angle between the main surface and compressive stress in a stress profile by a Babinet compensator method is θ, a value y of $\{12 \cdot t \cdot \ln(\tan \theta) + (49.1/t)\}$ is the penetration length in the uppermost-portion stress layer or less.

Herein, the penetration length in the uppermost-portion stress layer is a length of the longer diagonal in an indentation when a diamond quadrangular pyramid indenter of rhombic transverse section with vertex angles of 172° 30' and 130° is pressed against the main surface with a pressing force of 100 g, the tan θ is a value $\{(L_1+L_2)/(P_1+P_2)\}$ calculated from stress values and stress depths obtained by the Babinet compensator method, and the t is a thickness of the substrate.

$P_1$ is a compressive stress value, $P_2$ is a tensile stress value, $L_1$ is a compressive stress depth, and $L_2$ is a tensile stress depth.

According to this constitution, the compressive stress is high in the surface layer portion (with a depth of the order of about 1.5 µm from the substrate surface), rates of change in the stress values (compressive stress and tensile stress) in the depth direction inside the substrate are small, and it is thereby possible to satisfy impact resistance (for example, withstanding accelerations of 1500 G to 2000 G for one thousandth of a second) higher than the currently required impact resistance.

In the glass substrate for a magnetic disk of the invention, the value of y is preferably $\{16 \cdot t \cdot \ln(\tan \theta) + (49.1/t)\}$.

In the glass substrate for a magnetic disk of the invention, glass forming the glass substrate for a magnetic disk is preferably aluminosilicate glass containing Zr.

In the glass substrate for a magnetic disk of the invention, surface roughness Ra of the main surface measured by an atomic force microscope is preferably 0.3 nm or less.

In the glass substrate for a magnetic disk of the invention, surface roughness Ra of the end face is preferably 0.2 µm or less in a measurement length of 0.8 mm in the circumference direction of the glass substrate for a magnetic disk.

In the glass substrate for a magnetic disk of the invention, the compressive stress depth is preferably 50 µm or more.

A manufacturing method of a glass substrate for a magnetic disk of the invention is a manufacturing method of a glass substrate for a magnetic disk including the step of applying chemical reinforcement treatment to the glass substrate, and is characterized in that the chemical reinforcement treatment is performed under sufficient conditions so that the penetration length in the uppermost-portion stress layer on the main surface of the glass substrate for a magnetic disk is 49.1 µm or less, and that assuming that an angle between the main surface and compressive stress in a stress profile by a Babinet compensator method is θ, a value y of $\{12 \cdot t \cdot \ln(\tan \theta) + (49.1/t)\}$ is the penetration length in the uppermost-portion stress layer or less.

Herein, the penetration length in the uppermost-portion stress layer is a length of the longer diagonal in an indentation when a diamond quadrangular pyramid indenter of rhombic transverse section with vertex angles of 172° 30' and 130° is pressed against the main surface with a pressing force of 100 g, the tan θ is a value $\{(L_1+L_2)/(P_1+P_2)\}$ calculated from stress values and stress depths obtained by the Babinet compensator method, and the t is a thickness of the substrate.

$P_1$ is a compressive stress value, $P_2$ is a tensile stress value, $L_1$ is a compressive stress depth, and $L_2$ is a tensile stress depth.

According to this method, the compressive stress is high in the surface layer portion (with a depth of the order of about 1.5 µm from the substrate surface), rates of change in the stress values (compressive stress and tensile stress) in the depth direction inside the substrate are small, and it is thereby possible to obtain glass substrates for a magnetic disk satisfying impact resistance (for example, withstanding accelerations of 1500 G to 2000 G for one thousandth of a second) higher than the currently required impact resistance.

In the manufacturing method of a glass substrate for a magnetic disk of the invention, the value of y is preferably {16·t·ln(tan θ)+(49.1/t)}.

In the manufacturing method of a glass substrate for a magnetic disk of the invention, glass forming the glass substrate for a magnetic disk is preferably aluminosilicate glass containing Zr.

A magnetic disk of the invention is characterized by having the above-mentioned glass substrate for a magnetic disk, and a magnetic layer provided on the main surface of the glass substrate for a magnetic disk directly or via another layer.

A manufacturing method of a glass substrate for a magnetic disk of the invention is a manufacturing method of a glass substrate for a magnetic disk including a chemical reinforcement treatment step of immersing a disk-shaped glass substrate with a circular hole formed at its center portion in a chemical reinforcement treatment solution, causing ion exchange for replacing relatively small ions contained in the surface of the glass substrate with relatively large ions contained in the chemical reinforcement treatment solution, and thereby creating a compressive stress layer in the surface of the glass substrate, and is characterized in that the chemical reinforcement treatment is performed so that a deformation amount of the circular hole formed at the center portion of the disk-shaped glass substrate is within 0.05% of the diameter of the circular hole, and that the transverse strength of the disk-shaped glass substrate is 98 N or more.

A manufacturing method of a glass substrate for a magnetic disk of the invention is a manufacturing method of a doughnut-shaped glass substrate for a magnetic disk having a circular hole at its center portion, and is characterized in that when diameters of circular holes of 500 to 1000 glass substrates that are arbitrarily selected are measured, the diameter of the circular hole of each of the glass substrates is within the range of $\pm 5 \times 10^{-4} \times A$ relative to the average diameter A of the circular holes of the glass substrates, the transverse strength of each glass substrate is 98 N or more, and that control is thus performed.

In the manufacturing method of a glass substrate for a magnetic disk of the invention, it is preferable that the glass substrate for a magnetic disk is a 2.5-inch substrate, and that the diameter of the circular hole of each glass substrate is within A±10 µm.

A manufacturing method of a glass substrate for a magnetic disk of the invention is a manufacturing method of a glass substrate for a magnetic disk including a chemical reinforcement treatment step of immersing a disk-shaped glass substrate with a circular hole formed at its center portion in a chemical reinforcement treatment solution, causing ion exchange for replacing relatively small ions contained in the surface of the glass substrate with relatively large ions contained in the chemical reinforcement treatment solution, and thereby creating a compressive stress layer in the surface of the glass substrate, and is characterized in that the chemical reinforcement treatment is performed by selecting a glass material of the disk-shaped glass substrate and treatment conditions of the chemical reinforcement treatment so that a deformation amount of the circular hole formed at the center portion of the disk-shaped glass substrate is within 0.05% of the diameter of the circular hole, and that the transverse strength of the disk-shaped glass substrate is 98 N or more.

A manufacturing method of a glass substrate for a magnetic disk of the invention is a manufacturing method of a glass substrate for a magnetic disk including a chemical reinforcement treatment step of immersing a disk-shaped glass substrate with a circular hole formed at its center portion in a chemical reinforcement treatment solution, causing ion exchange for replacing relatively small ions contained in the surface of the glass substrate with relatively large ions contained in the chemical reinforcement treatment solution, and thereby creating a compressive stress layer in the surface of the glass substrate, and is characterized in that a deformation amount due to the chemical reinforcement treatment of the circular hole formed at the center portion of the disk-shaped glass substrate is beforehand grasped for each glass, a glass material is selected so that the deformation amount is within 0.05% of the diameter of the circular hole, and that the transverse strength of the disk-shaped glass substrate due to the chemical reinforcement treatment is 98 N or more, the selected glass material is processed in disk form, while the circular hole is formed at the center portion, and the chemical reinforcement treatment is performed.

In the manufacturing method of a glass substrate for a magnetic disk of the invention, glass for chemical reinforcement forming the disk-shaped glass substrate with the circular hole formed at its center portion preferably contains in expression of percent by mass:

$SiO_2$ 57~75%;
$Al_2O_3$ 5~20%;
(where the total amount of $SiO_2+Al_2O_3$ is 74% or more)
the total of $ZrO_2$, $HfO_2$, $Nb_2O_5$, $Ta_2O_5$, $La_2O_3$, $Y_2O_3$, and $TiO_2$ exceeding 0% to 6% or less;
$Li_2O$ exceeding 1% to 9% or less;
$Na_2O$ 5~18%;
(where the mass ratio $Li_2O/Na_2O$ is 0.5 or less)
$K_2O$ 0~6%;
$MgO$ 0~4%;
$CaO$ exceeding 0% to 5% or less;
(where the total amount of $MgO$ and $CaO$ is 5% or less, and the content of $CaO$ is higher than the content of $MgO$) and
$SrO+BaO$ 0~3%.

In the manufacturing method of a glass substrate for a magnetic disk of the invention, the chemical reinforcement treatment is preferably performed using a chemical reinforcement treatment solution having a composition with 60 percent to 80 percent by mass $KNO_3$ and 40 percent to 20 percent by mass $NaNO_3$ (where 100 percent by mass in total) at a temperature ranging from 350° C. to 420° C.

In the manufacturing method of a glass substrate for a magnetic disk of the invention, a thickness of the compressive stress layer in the disk-shaped glass substrate subjected to the chemical reinforcement treatment preferably ranges from 10 µm to 150 µm.

In the manufacturing method of a glass substrate for a magnetic disk of the invention, it is preferable to support a magnetic disk in which a track density of information to record is at least 100-gigabit TPI.

In the manufacturing method of a glass substrate for a magnetic disk of the invention, it is preferable to support a perpendicular magnetic recording system.

BEST MODE FOR CARRYING OUT THE INVENTION

Embodiments of the invention will specifically be described below with reference to accompanying drawings.

Embodiment 1

A glass substrate for a magnetic disk according to the invention is a glass substrate for a magnetic disk installed in a hard disk drive (HDD), etc. for example. The magnetic disk is, for example, a recording medium enabling high-density information signals to be recorded and reproduced by the perpendicular magnetic recording system. Further, the glass substrate for a magnetic disk is mainly used for 1.8-inch magnetic disks and 2.5-inch magnetic disks.

In the glass substrate for a magnetic disk according to the invention, the penetration length in the uppermost-portion stress layer on the main surface is 49.1 μm or less, and when it is assumed that an angle between the main surface and compressive stress in a stress profile by a Babinet compensator method is $\theta$, a value y of $\{12 \cdot t \cdot \ln(\tan \theta) + (49.1/t)\}$ is the penetration length in the uppermost-portion stress layer or less. Therefore, the glass substrate is capable of meeting impact resistance higher than the currently required impact resistance. In addition, the penetration length in the uppermost-portion stress layer is a length of the longer diagonal in an indentation when a diamond quadrangular pyramid indenter of rhombic transverse section with vertex angles of 172° 30' and 130° is pressed against the main surface with a pressing force of 100 g, tan θ is a value $\{(L_1+L_2)/(P_1+P_2)\}$ calculated from stress values and stress depths obtained by the Babinet compensator method, and t is a thickness of the substrate.

$P_1$ is a compressive stress value, $P_2$ is a tensile stress value, $L_1$ is a compressive stress depth, and $L_2$ is a tensile stress depth.

Figure 1:
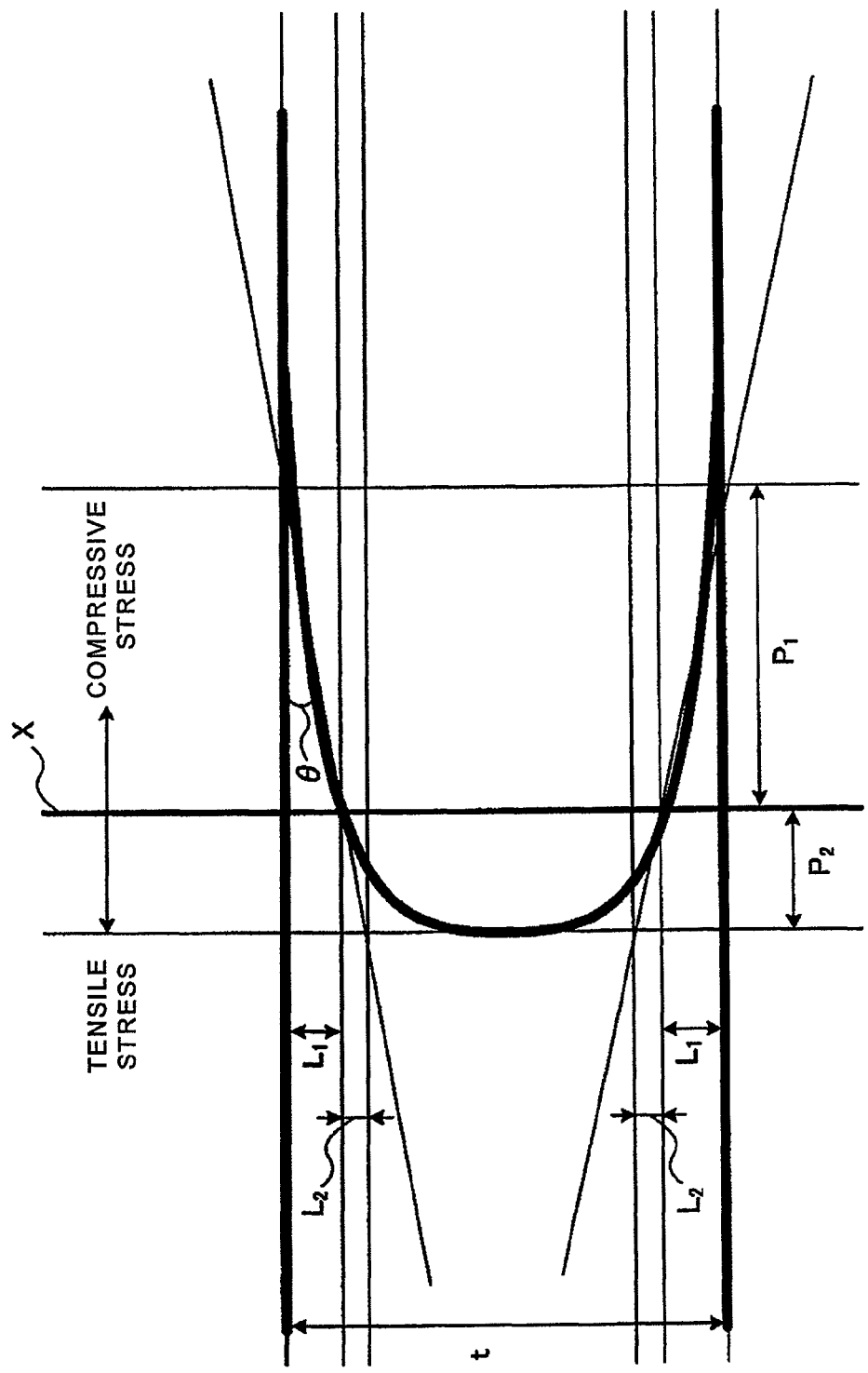
FIG. 1 is a diagram illustrating a stress profile in a glass substrate.

In the glass substrate subjected to chemical reinforcement, the compressive stress layer is formed in the surface layer by replacing ions of atoms contained in the glass forming the glass substrate with ions of atoms having an atomic radius larger than that of the atoms. FIG. 1 shows a stress profile in the glass substrate thus subjected to the chemical reinforcement treatment. FIG. 1 is a diagram showing the stress profile in the glass substrate with a thickness t. In FIG. 1, an area to the right of the line X at the center is an area of compressive stress, while an area to the left of the line X is an area of tensile stress. In other words, in FIG. 1, $P_1$ represents a compressive stress value, and $P_2$ represents a tensile stress value. Further, in FIG. 1, $L_1$ represents a compressive stress depth, and $L_2$ represents a tensile stress depth. In the area of compressive stress, as the compressive stress value $P_1$ increases, the degree of reinforcement is higher. Further, in the area of tensile stress, the distance (depth) from the substrate surface to the stress profile is a distance such that a fracture occurs when a crack reaches the stress profile from the substrate surface, and as the depth increases, the glass is harder to break.

From the viewpoint of impact resistance (fracture-proof), when θ represents a gradient of the stress profile (angle between the main surface and compressive stress) of from the area of compressive stress to the area of tensile stress, it is preferable that tan θ is large, i.e. the distance (depth) from the substrate surface to the stress profile is large. This is because a stress variation of from the main surface to the inside is moderate when tan θ is large, and it is possible to effectively suppress a crack that tends to extend against impact of a short time (two-thousandths of a second or less). Meanwhile, when tan θ is increased in the stress profile, the compressive stress value P1 decreases consequently. Under such circumstances, the inventors of the invention directed attention to a microsurface layer portion in the substrate surface, found out that impact resistance can be improved by increasing hardness of the substrate surface layer portion even when tan θ is increased in the stress profile and the compressive stress value P1 is low, and reached the present invention.

The hardness of the substrate surface layer is evaluated using the length (uppermost-portion stress layer penetration length) of the longer diagonal in an indentation when a diamond quadrangular pyramid indenter of rhombic transverse section with vertex angles of 172°30' and 130° is pressed against the main surface with a pressing force of 100 g. According to such an evaluation method, it is possible to indirectly represent the hardness in a thin surface layer with a thickness of about 1 μm to 2 μm in the substrate surface. In addition, the evaluation method of the hardness of the surface layer in the substrate surface is not limited thereto, and any method can be used which enables the hardness in a thin surface layer with a thickness of about 1 μm to 2 μm in the substrate surface to be represented. In the invention, the length of the longer diagonal in the indentation in the above-mentioned evaluation method is 49.1 μm or less.

Further, when an angle between the main surface and compressive stress in the stress profile by a Babinet compensator method is assumed to be θ, a value y of $\{12 \cdot t \cdot \ln(\tan \theta)+(49.1/t)\}$ is made the penetration length in the uppermost-portion stress layer or less. Tan θ is a value $\{(L_1+L_2)/(P_1+P_2)\}$ calculated from stress values and stress depths obtained by the Babinet compensator method, and t is a thickness of the substrate.

Figure 2:
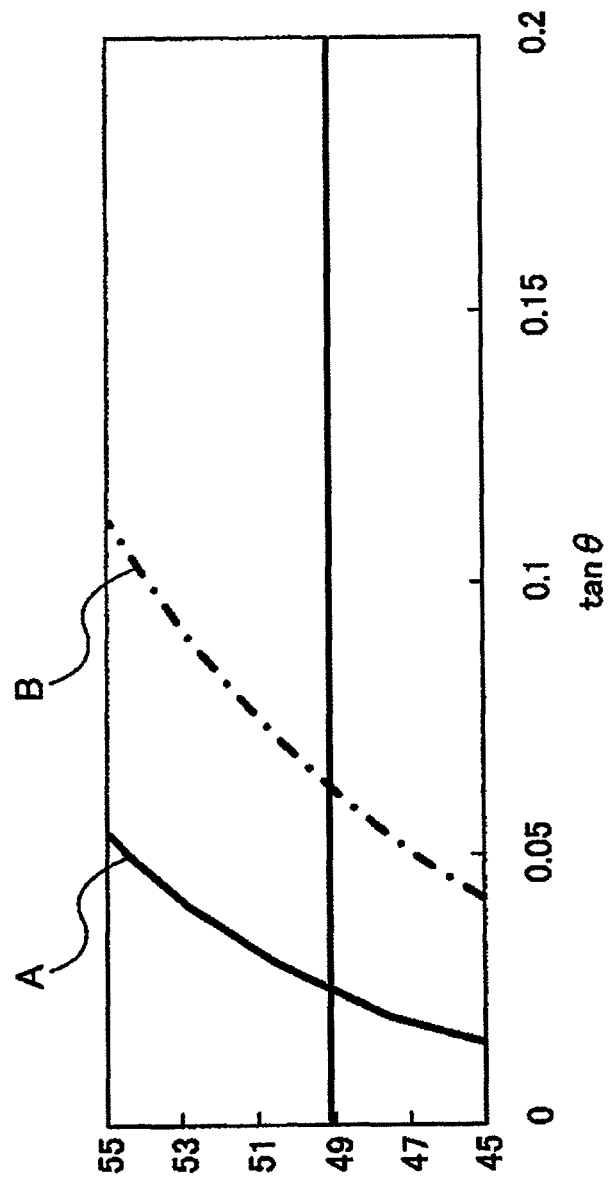
FIG. 2 is a diagram illustrating a relationship between an uppermost surface layer stress penetration length and tan θ.

At this point, $P_1$ is a compressive stress value, $P_2$ is a tensile stress value, $L_1$ is a compressive stress depth, and $L_2$ is a tensile stress depth. The characteristic curve of y=$\{12 \cdot t \cdot \ln(\tan \theta)+(49.1/t)\}$ is a characteristic curve A shown in FIG. 2. Accordingly, the glass substrate according to the invention has characteristics of the area such that the uppermost-portion stress layer penetration length is 49.1 or less in this characteristic curve. More preferably, the glass substrate has an area of y=$\{16 \cdot t \cdot \ln(\tan \theta)+(49.1/t)\}$ that is a characteristic curve B shown in FIG. 2. As described above, tan θ is preferably larger from the viewpoint of rupture resistance. Therefore, in the glass substrate according to the invention, in FIG. 2, it is preferable that the uppermost-portion stress layer penetration length is 49.1 μm or less, and that the glass substrate has characteristics to the right (side where tan θ is larger) of the characteristic curve A, and more preferably, characteristics of the area (right lower area in FIG. 2) to the right (side where tan θ is larger) of the characteristic curve B.

The stress profile as shown in FIG. 1 can be obtained from the Babinet compensator method. In addition, the Babinet compensator is an instrument including two opposite quartz wedges having equal angles, and one of the wedges is moved in the length direction with a screw of a micrometer. In the two wedges, the optical axis directions are mutually perpendicular, and the optical axis direction of one movable wedge is along the movable direction. This instrument has widely been used for examinations of retardation in phase difference and the degree of double refraction in crystals, tests of glass with internal stress, etc.

The manufacturing of the glass substrate is provided with (1) shape processing step and first lapping step, (2) end portion forming step (coring step of forming a hole portion, chamfering step (chamfered surface forming step) of forming chamfered surfaces in the end portions (outer circumferential end portion and inner circumferential end portion), (3) end face polishing step (outer circumferential end portion and inner circumferential end portion), (4) second lapping step, (5) main surface polishing step (first and second polishing steps), and (6) chemical reinforcement step. In addition, the steps except the chemical reinforcement step are performed under conditions that are generally performed.

To obtain the glass substrate having the above-mentioned properties, it is necessary to set the glass composition and chemical reinforcement conditions properly in (6) chemical reinforcement step. In other words, the glass composition and chemical reinforcement conditions are set suitably so that the penetration length in the uppermost-portion stress layer on the main surface is 49.1 μm or less, and that assuming that an angle between the main surface and compressive stress in the stress profile by the Babinet compensator method is θ, a value y of $\{12 \cdot t \cdot \ln(\tan\theta) + (49.1/t)\}$ is the penetration length in the uppermost-portion stress layer or less.

Glass materials forming the glass substrate include aluminosilicate glass. The aluminosilicate glass enables excellent smooth mirror finished surface to be achieved, and further, enables its breaking strength to be enhanced by undergoing chemical reinforcement. Particularly, it is preferable that the aluminosilicate glass contains Zr. By the aluminosilicate glass thus containing Zr, it is possible to increase the modulus of rigidity (=Young's modulus/specific gravity) of the substrate.

More specifically, as the aluminosilicate glass, it is possible to preferably use the glass where $SiO_2$ is 57 percent to 75 percent by mass, $Al_2O_3$ is 5 percent to 20 percent by mass, (where the total amount of $SiO_2+Al_2O_3$ is 74 percent by mass or more), the total of $ZrO_2$, $HfO_2$, $Nb_2O_5$, $Ta_2O_5$, $La_2O_3$, $Y_2O_3$, and $TiO_2$ exceeds 0 up to 6 percent by mass or less, $Li_2O$ exceeds 1 percent by mass up to 9 percent by mass or less, $Na_2O$ is 5 percent to 18 percent by mass (where the mass ratio $Li_2O/Na_2O$ is 0.5 or less), $K_2O$ is 0 to 6 percent by mass, MgO is 0 to 4 percent by mass, CaO exceeds 0 up to 5 percent by mass or less, (where the total amount of MgO and CaO is 5 percent by mass or less, and the content of CaO is higher than the content of MgO), and SrO+BaO is 0 to 3 percent by mass.

$SiO_2$ is a main component forming the glass skeleton, and is a component functioning to improve glass stability and chemical durability, particularly, acid resistance, decrease thermal diffusion of the substrate, and increase heating efficiency of the substrate due to radiation. When the content is less than 57%, devitrification resistance decreases, it is hard to obtain glass that can be manufactured with stability, the viscosity decreases, and forming is made difficult. Meanwhile, when the content exceeds 75%, melting of glass is made difficult. In terms of devitrification resistance, viscosity, forming property, etc. the content of $SiO_2$ is preferably in the range of 63 percent to 70 percent by mass, and more preferably, in the range of 63 percent to 68 percent by mass.

$Al_2O_3$ is a component for improving chemical durability, while promoting ion exchange, and when the content is less than 5 percent by mass, the aforementioned effects are not exhibited sufficiently, while when the content exceeds 20 percent by mass, the melting property and devitrification resistance of the glass tends to decrease. In terms of balance among chemical durability, ion exchange property, and melting property and devitrification resistance of the glass, etc. the content of $Al_2O_3$ is preferably in the range of 11 percent to 20 percent by mass, and more preferably, in the range of 13 percent to 18 percent by mass.

It is possible to substitute $SiO_2$ and $Al_2O_3$ for each other, but in terms of maintaining glass stability and chemical durability excellently, it is preferable that the total content of $SiO_2$ and $Al_2O_3$ is 74 percent by mass or more. The preferable range of the total amount is 76 percent by mass or more, the more preferable range is 78 percent by mass or more, the further preferable range is the range exceeding 79 percent by mass, and the furthermore preferable range is 80 percent by mass or more.

Alkali metal oxides such as $Li_2O$, $Na_2O$ and $K_2O$ function to enhance the melting property of glass, while increasing the coefficient of thermal expansion, and provide substrates for information recording media, particularly, substrates for magnetic recording media with a preferable thermal expansion property.

$Li_2O$ is a most preferable component as an alkali ion used for ion exchange, and the content of 1 percent by mass or less makes it hard to obtain chemically reinforced glass having a thick compressive stress layer and strength when the chemical reinforcement treatment is performed, while when the content exceeds 9 percent, chemical durability and devitrification resistance tends to decrease. In terms of performance, chemical durability and devitrification resistance of chemically reinforced glass, etc. the content of $Li_2O$ is preferably in the range of 1.5 percent to 7 percent by mass, and more preferably, in the range of 2 percent to 5 percent by mass.

As well as $Li_2O$, $Na_2O$ is a component to obtain chemically reinforced glass, and when the content is less than 5 percent by mass, it is hard to obtain chemically reinforced glass having desired performance, while when the content exceeds 18 percent by mass, chemical durability tends to decrease. In terms of performance and chemical durability of chemically reinforced glass, etc. the content of $Na_2O$ is preferably in the range of 7 percent to 16 percent by mass, and more preferably, in the range of 8 percent to 15 percent by mass. Further, as an alkali component, $K_2O$ can be used, but since $K_2O$ is not involved in ion exchange, the content is about 0 to 6 percent by mass.

In addition, the ratio ($Li_2O/Na_2O$) of $Li_2O$ amount to $Na_2O$ amount is usually 0.5 or less, preferably 0.45 or less, more preferably 0.4 or less, and further preferably, 0.38 or less. Glass components directly contributing to ion exchange in chemical reinforcement are $Li_2O$ and $Na_2O$, and an alkali ion contributing to ion exchange in a melting salt is the Na ion and/or K ion. As the number of substrates to undergo chemical reinforcement treatment increases, the concentration of Li ion in the melting salt increases. Then, when a large amount of the glass with the ratio of $Li_2O/Na_2O$ exceeding 0.5 is treated, increases in the concentration of Li ion in the melting salt become remarkable, and the balance between the alkali ion that contributes to ion exchange and the alkali ion that does not contribute to ion exchange changes largely from that at the treatment starting time. As a result, the treatment conditions optimized at the treatment starting time deviate from the optimal range, as the number of treated substrates increases. In order to solve such a problem, the ratio of $Li_2O/Na_2O$ is preferably set at the above-mentioned range.

MgO and CaO have the effect of improving the melting property of glass by being added in small amounts, but are not preferable in large amounts, because each addition in a large amount inhibits ion exchange, and decreases the thickness of the compressive stress layer of the obtained chemically reinforced glass. Accordingly, the content of MgO preferably ranges from 0 to 4 percent by mass, and the content of CaO preferably exceeds 0 percent up to 5 percent by mass or less.

Moreover, since chemical durability tends to deteriorate when the total amount of MgO and CaO exceeds 5%, the total amount of MgO and CaO is preferably 5 percent by mass or less, more preferably 4.5 percent by mass or less, and further preferably 4 percent by mass or less. Further, to make devitrification resistance excellent, the content of CaO is preferably higher than the content of MgO. In terms of further increasing chemical durability, it is preferable that MgO and CaO coexist as glass components. Then, by making the ratio (MgO/CaO) of the MgO amount to the CaO amount preferably 0.1 to 0.9, more preferably 0.3 to 0.7, it is possible to further increase chemical durability, and also increase glass stability.

$ZrO_2$, $HfO_2$, $Nb_2O_5$, $Ta_2O_5$, $La_2O_3$, $Y_2O_3$, and $TiO_2$ are components for increasing chemical durability, particularly alkali resistance, and enhancing rigidity and toughness. Therefore, the total content of $ZrO_2$, $HfO_2$, $Nb_2O_5$, $Ta_2O_5$, $La_2O_3$, $Y_2O_3$, and $TiO_2$ preferably exceeds 0%. However, when the total content exceeds 6 percent by mass, glass stability decreases, the melting property decreases, and/or the specific gravity increases. Therefore, it is preferable that the total content of $ZrO_2$, $HfO_2$, $Nb_2O_5$, $Ta_2O_5$, $La_2O_3$, $Y_2O_3$, and $TiO_2$ exceeds 0 up to 6 percent by mass or less. In the total content, the preferable range is 5.5 percent by mass or less, the more preferable range is 4 percent by mass or less, and the further preferable range is 3 percent by mass or less. In the total content, the preferable lower limit is 0.1 percent by mass, the more preferable lower limit is 0.2 percent by mass, the further preferable lower limit is 0.5 percent by mass, the furthermore preferable lower limit is 1 percent by mass, and the still furthermore preferable lower limit is 1.4 percent by mass.

Among $ZrO_2$, $HfO_2$, $Nb_2O_5$, $Ta_2O_5$, $La_2O_3$, $Y_2O_3$, and $TiO_2$, in the glass containing $TiO_2$, the production of reaction between the glass and water may adhere to the glass surface when the glass is immersed in water, and the other components are advantageous with respect to water resistance. Accordingly, in terms of maintaining water resistance, the content of $TiO_2$ preferably ranges from 0 to 1 percent by mass, and more preferably from 0 to 0.5 percent by mass, and no introduction is further preferable.

$HfO_2$, $Nb_2O_5$, $Ta_2O_5$ and $La_2O_3$ increase the specific gravity of the glass, and increase the mass of the substrate, and therefore, in terms of reducing the weight of the substrate, the total content of $HfO_2$, $Nb_2O_5$, $Ta_2O_5$ and $La_2O_3$ is preferably in the range of 0 to 3 percent by mass, more preferably in the range of 0 to 2 percent by mass, and further preferably in the range of 0 to 1 percent by mass, and no addition is furthermore preferable. The content of each of $HfO_2$, $Nb_2O_5$, $Ta_2O_5$ and $La_2O_3$ preferably ranges from 0 to 3 percent by mass, more preferably from 0 to 2 percent by mass, and further preferably from 0 to 1 percent by mass, and no introduction is furthermore preferable.

$ZrO_2$ is high in the function of enhancing chemical durability, particularly alkali resistance, and has the functions of increasing rigidity and toughness, while enhancing efficiency in chemical reinforcement. Further, since the material cost is lower than $Y_2O_3$, the mass ratio of the content of $ZrO_2$ to the total content of $ZrO_2$, $HfO_2$, $Nb_2O_5$, $Ta_2O_5$, $La_2O_3$, $Y_2O_3$, and $TiO_2$ is preferably in the range of 0.8 to 1, more preferably in the range of 0.9 to 1, further preferably in the range of 0.95 to 1, and furthermore preferably, 1.

Introduction of $ZrO_2$ even in a very small amount enhances chemical durability, particularly alkali resistance, and provides the functions of increasing rigidity and toughness, while further increasing efficiency in chemical reinforcement, and $ZrO_2$ is thus an essential component. However, when $ZrO_2$ is introduced excessively in a thinned substrate, efficiency in chemical reinforcement is too high, an excessive compressive stress layer is formed, and swells tend to occur in the substrate. Accordingly, it is preferable that the content of $ZrO_2$ exceeds 0 percent up to 5.5 percent by mass or less. The preferable range of the content of $ZrO_2$ is 0.1 percent to 5.5 percent by mass. In the content of $ZrO_2$, the preferable lower limit is 0.2 percent by mass, the more preferable lower limit is 0.5 percent by mass, the further preferable lower limit is 1 percent by mass, the furthermore preferable lower limit is 1.4 percent by mass, the preferable upper limit is 5 percent by mass, the more preferable upper limit is 4 percent by mass, and the further preferable upper limit is 3 percent by mass.

It is effective to introduce an additive for absorbing infrared rays to the glass so as to increase IR absorption of the glass, as well as reducing thermal diffusion of the substrate. Examples of such an infrared ray absorbing additive are Fe, Cu, Co, Yb, Mn, Nd, Pr, V, Cr, Ni, Mo, Ho, Er and water. Fe, Cu, Co, Yb, Mn, Nd, Pr, V, Cr, Ni, Mo, Ho and Er exist as ions in the glass. When the ions are reduced, the components are deposited in the glass or on the surface, and there is a risk of impairing smoothness of the substrate surface. Therefore, it is important to control the total content to within 0 to 1 percent by mass, and the content is preferably in the range of 0 to 0.5 percent by mass, and more preferably in the range of 0 to 0.2 percent by mass. In terms of $Fe_2O_3$, an introduction amount of Fe is preferably 1 percent by mass or less, more preferably 0.5 percent by mass or less, further preferably 0.2 percent by mass, furthermore preferably 0.1 percent by mass, and still furthermore preferably 0.05 percent by mass. The preferable lower limit amount is 0.01 percent by mass, and the more preferable lower limit amount is 0.03 percent by mass. The particularly preferable range is from 0.03 percent by mass to 0.02 percent by mass. When the above-mentioned additives are used, it is desired to introduce Fe with high infrared ray absorption. In either method, since introduction of these additives in a minute quantity produces the effect, glass materials containing the additives as impurities, for example, silica materials may be used. However, even as the impurities, the amount is required to be certain, and attention should be directed toward the above-mentioned respects in selecting materials. In addition, Fe reacts with platinum or platinum alloy forming a part of melting chamber of the glass, agitating rod, or a tube to flow the glass to be an alloy and imposes damage on the chamber, agitating rod, and tube, and when these instruments are used, it is preferable to suppress the additive amount of Fe. In such a case, it is more preferable not to introduce $Fe_2O_3$. $B_2O_3$ functions to enhance the melting property, but has volatility, and may erode a fire-resistive substance in melting the glass. Therefore, the content is, for example, less than 2 percent by mass, and preferably ranges from 0 to 1.5 percent by mass, more preferably from 0 to 1 percent by mass, and further preferably from 0 to 0.4 percent by mass, and no introduction is furthermore preferable.

$Sb_2O_3$, $As_2O_3$, $SnO_2$ and $CeO_2$ may be used as a clarifier. However, $As_2O_3$ imposes loads on environments, and particularly, when the substrate is manufactured through the float method, it is desired not to use $As_2O_3$.

In the glass for chemical reinforcement having such a glass composition for use in the invention, the specific gravity ranges generally from about 2.3 to 2.8, and preferably from 2.4 to 2.6, and the glass transition temperature ranges generally from 450° C. to 600° C., and preferably from 480° C. to 520° C.

The glass materials forming the glass substrate for use in the invention are not limited to the aforementioned materials, and examples of the materials are soda lime glass, soda alumino silicate glass, alumino boron-silicate glass, boron-silicate glass, quartz glass, chain silicate glass, and glass ceramics such as crystallized glass.

As a chemical reinforcement solution used for chemical reinforcement, although the solution is dependent on materials constituting the glass, in consideration of the melting point and cost, it is preferable to use potassium nitrate, sodium nitrate, etc. Further, as a chemical reinforcement temperature, in consideration of the melting point of the chemical reinforcement solution, glass transition point of the glass, etc. the temperature preferably ranges from 300° C. to 450° C. Furthermore, the chemical reinforcement time preferably ranges from 1 to 4 hours, in consideration of mass productivity. In addition, the chemical reinforcement conditions can be determined as appropriate corresponding to glass materials to use.

By applying such chemical reinforcement, it is possible to increase the compressive stress in the surface layer portion (with a depth of the order of about 1.5 μm from the substrate surface) and to decrease the rates of change in the stress values (compressive stress and tensile stress) in the depth direction inside the substrate. By this means, it is possible to obtain glass substrates having characteristics that the penetration length in the uppermost-portion stress layer on the main surface is 49.1 μm or less, and that assuming that an angle between the main surface and compressive stress in the stress profile by the Babinet compensator method is θ, a value y of $\{12 \cdot t \cdot \ln(\tan \theta) + (49.1/t)\}$ is the penetration length in the uppermost-portion stress layer or less. In this case, the compressive stress depth is preferably 50 μm or more. In addition, by performing chemical reinforcement by two-step ion exchange that Li+ contained in the glass is replaced with Na+ in ion exchange as the first step, and that Na+ is replaced with K+ in ion exchange as the second step, it is possible to efficiently obtain the glass substrate having the above-mentioned characteristics.

In the glass substrate for a magnetic disk according to the invention, surface roughness Ra of the main surface measured by an atomic force microscope (AFM) is preferably 0.3 nm or less. Further, in the glass substrate for a magnetic disk according to the invention, surface roughness Ra of the end face is preferably 0.2 μm or less in a measurement length of 0.8 mm in the circumference direction of the glass substrate. By this means, it is possible to further enhance impact resistance.

A magnetic layer is provided on the glass substrate obtained as described above directly or via another layer, and it is thereby possible to prepare a magnetic disk. As the magnetic layer, it is preferable to use a Co—Pt alloy magnetic layer having a high anisotropy magnetic field (Hk). Further, from the viewpoint of aiming at crystal orientation of the magnetic layer, and uniformity and fine particles of grains, a backing layer may be formed as appropriate between the glass substrate for a magnetic disk and the magnetic layer. Furthermore, it is preferable to provide a protective layer on the magnetic layer to protect the magnetic layer. Still furthermore, it is preferable to form a lubrication layer on the protective layer to relieve impact from a magnetic head.

Thus, in the glass substrate for a magnetic disk according to the invention, the compressive stress is high in the surface layer portion (with a depth of the order of about 1.5 μm from the substrate surface), rates of change in the stress values (compressive stress and tensile stress) in the depth direction inside the substrate are small, and it is thereby possible to meet impact resistance (for example, withstanding accelerations of 1500 G to 2000 G for one thousandth of a second) higher than currently required impact resistance.

Described next are Examples performed to clarify the effects of the invention.

EXAMPLE

First, melted alumino silicate glass was formed in the shape of a disk by direct press using an upper die, lower die and barrel die, and plate-shaped amorphous glass was obtained. Next, both main surfaces of the plate-shaped glass underwent lapping processing, and a disk-shaped glass base material was obtained. Then, a hole portion was formed at the center of the glass base material using a diamond cutter, and a disk-shaped glass substrate was obtained (coring). In addition, in the used alumino silicate glass, main components were $SiO_2$: 70 percent by mass, $Al_2O_3$: 10 percent by mass., $Li_2O$: 5 percent by mass, $Na_2O$: 7 percent by mass, $ZrO_2$: 8 percent by mass.

Next, end faces of the glass substrate underwent mirror-surface polishing by a brush polishing method. At this time, used as the polishing grains was slurry (free polishing grains) containing cerium dioxide polishing grains. Further, the inner circumferential end portion underwent mirror-surface polishing by a magnetic polishing method. Then, the glass substrate subjected to the mirror-surface polishing step was rinsed by water. By this means, the diameter of the glass substrate was 65 mm, and the substrate for use in a 2.5-inch magnetic disk was prepared.

Next, the both main surfaces of the obtained glass substrate underwent lapping processing as in the above-mentioned lapping. Then, as the main-surface polishing step, the first polishing step was applied. Used as a polishing agent were cerium dioxide polishing grains. Then, the glass substrate subjected to the first polishing step was immersed sequentially in washing tanks respectively of a natural detergent, pure water (1), pure water (2), IPA (isopropyl alcohol) and IPA (steam dry) and washed.

Then, the both main surfaces of the obtained glass substrate underwent the second polishing step to finish the main surfaces in mirror surface form. Used as a polishing agent were cerium dioxide polishing grains finer than the cerium dioxide polishing grains used in the first polishing step. Then, the glass substrate subjected to the second polishing step was immersed sequentially in washing tanks respectively of a natural detergent (1), natural detergent (2), pure water (1), pure water (2), IPA (isopropyl alcohol) and IPA (steam dry) and washed. In addition, ultrasonic waves were applied to each washing tank.

Next, the glass substrate subjected to the above-mentioned lapping steps and polishing steps underwent chemical reinforcement. The chemical reinforcement was performed by preparing a chemical reinforcement solution of a composition that potassium nitrate:sodium nitrate=8:2 in weight ratio, heating the chemical reinforcement solution to 400° C., and immersing the washed glass substrate in the solution for about 4 hours. Thus, by immersing and treating in/with the chemical reinforcement solution, Li ions and Na ions in the surface layer of the glass substrate were respectively replaced with Na ions and K ions in the chemical reinforcement solution, and the surface layer of the glass substrate was reinforced. At this point, the thickness of the compressive stress layer was 114 μm.

Such a glass substrate was immersed in a water tank of 20° C. for quenching, and kept for about 10 minutes. The quenched glass substrate was immersed in concentrated sulfuric acid heated to about 40° C. and washed. Further, the glass substrate subjected to sulfuric acid cleaning was immersed sequentially in washing tanks respectively of pure water (1), pure water (2), IPA (isopropyl alcohol) and IPA (steam dry) and washed. In addition, ultrasonic waves were applied to each washing tank.

For thus prepared glass substrate for a magnetic disk with a thickness of 0.635 mm and the most outside diameter of 65 mm, when the length of the longer diagonal (uppermost-portion stress layer penetration length) in an indentation was examined by pressing a diamond quadrangular pyramid indenter of rhombic transverse section with vertex angles of 172° 30' and 130° against the main surface with a pressing force of 100 g, the length was 45.3 μm and less than 49.1 μm. Further, the section of the glass substrate for a magnetic disk was measured using the Babinet compensator method, and the stress profile was obtained as shown in FIG. 1. At this point, assuming that an angle between the main surface and compressive stress is θ, a value y of $\{12 \cdot \ln(\tan \theta) + (49.1/t)\}$ was 53.8 μm, and more than the uppermost-portion stress layer penetration length. In addition, tan θ is a value $\{(L_1 + L_2)/(P_1 + P_2)\}$ calculated from stress values and stress depths obtained by the Babinet compensator method, and t is the thickness of the substrate. At this point, $P_1$ is a compressive stress value, $P_2$ is a tensile stress value, $L_1$ is a compressive stress depth, and $L_2$ is a tensile stress depth. Thus, in this glass substrate, the compressive stress was high in the surface layer portion (with a depth of the order of about 1.5 μm from the substrate surface), and rates of change in the stress values (compressive stress and tensile stress) were small in the depth direction inside the substrate.

For the glass substrates for a magnetic disk, impact resistance was evaluated by the Dana impact test method using AVEX-SM-110-MP (Air Brown Co., Ltd. Brand name). This impact test was performed by setting the glass substrate for a magnetic disk in a dedicated impact test device, applying half-sine shock pulses in the perpendicular direction to the main surface under a condition of 900 G at 0.2 millisecond and another condition of 1500 G at 1 millisecond, and examining a fracture status of the glass substrate for a magnetic disk. As a result, any fracture did not occur in the glass substrate under any of the conditions.

COMPARATIVE EXAMPLE

Glass substrates for a magnetic disk were prepared as in the Example except that chemical reinforcement was performed under following conditions. The chemical reinforcement was performed by preparing a chemical reinforcement solution of a composition that potassium nitrate:sodium nitrate=5:5 in weight ratio, heating the chemical reinforcement solution to 340° C., and immersing the washed glass substrate in the solution for about 2 hours. At this point, the thickness of the compressive stress layer was 80 μm.

For thus prepared glass substrate for a magnetic disk with a thickness of 0.635 mm and the most outside diameter of 65 mm, when the length of the longer diagonal (uppermost-portion stress layer penetration length) in an indentation was examined by pressing the diamond quadrangular pyramid indenter of rhombic transverse section with vertex angles of 172°30' and 130° against the main surface with a pressing force of 100 g, the length was 49.4 μm and less than 49.1 μm.

For the glass substrates for a magnetic disk, when impact resistance was evaluated as in the Example, any fracture did not occur under the condition of 900 G at 0.2 millisecond, but fractures occurred in some substrates under the condition of 1500 G at 1 millisecond.

Embodiment 2

In the method of manufacturing the glass substrate for a magnetic disk in this Embodiment, there are four aspects i.e. manufacturing method 1, manufacturing method 2, manufacturing method 3 and manufacturing method 4 as described below.

[Manufacturing Method 1 of the Glass Substrate for a Magnetic Disk]

Manufacturing method 1 of the glass substrate for a magnetic disk of this Embodiment is a manufacturing method of a glass substrate for a magnetic disk including a chemical reinforcement treatment step of immersing a disk-shaped glass substrate with a circular hole formed at its center portion in a chemical reinforcement treatment solution, causing ion exchange for replacing relatively small ions contained in the surface of the glass substrate with relatively large ions contained in the chemical reinforcement treatment solution, and thereby creating a compressive stress layer in the surface of the glass substrate, and is characterized in that the chemical reinforcement treatment is performed so that a deformation amount of the circular hole formed at the center portion of the disk-shaped glass substrate is within 0.05% of the diameter of the circular hole, and that the transverse strength of the disk-shaped glass substrate is 98 N or more.

In manufacturing method 1 of this Embodiment, each disk-shaped glass substrate with a circular hole formed at its center portion is subjected to chemical reinforcement treatment for creating a compressive stress layer in the glass substrate surface by ion exchange, and the glass substrates for a magnetic disk are thereby manufactured.

Then, when the chemical reinforcement treatment is performed, chemical reinforcement conditions are selected so that a deformation amount of the circular hole formed at the center portion of the disk-shaped glass substrate is within 0.05% of the diameter of the circular hole, and that the transverse strength of the disk-shaped glass substrate is 98 N or more.

When the deformation amount of the circular hole is within 0.05% of the diameter of the circular hole, it is possible to prevent a misalignment from occurring between a recording reproduction track position set on the magnetic disk and a recoding reproduction track position on which a magnetic head runs, and to obtain glass substrates supporting high TPI (100 gigabits/inch square or more). The deformation amount of the circular hole is preferably within 0.025% of the diameter of the circular hole.

Further, when the transverse strength is 98 N or more, it is possible to prevent distortion from occurring in the glass substrate inside a hard disk drive. The transverse strength is preferably 118 N or more. Meanwhile, the upper limit is not limited particularly, but is normally about 147 N. In addition, the method of measuring the transverse strength will be described later.

[Manufacturing Method 2 of the Glass Substrate for a Magnetic Disk]

Manufacturing method 2 of the glass substrate for a magnetic disk of this Embodiment is a manufacturing method of a doughnut-shaped glass substrate for a magnetic disk having a circular hole at its center portion, and is characterized in that when diameters of circular holes of 500 to 1000 glass substrates that are arbitrarily selected are measured, the diameter of the circular hole of each of the glass substrates is within the range of $\pm 5 \times 10^{-4} \times A$ relative to the average diameter A of the circular holes of the glass substrates, the transverse strength of each glass substrate is 98 N or more, and that control is thus performed.

In manufacturing method 2 of this Embodiment, when the diameter of the circular hole of each glass substrate deviates from the range of $\pm 5 \times 10^{-4} \times A$ relative to the average diameter A of the circular holes of 500 to 1000 glass substrates that are arbitrarily selected, a misalignment occurs between a recording reproduction track position set on the magnetic disk and a recoding reproduction track position on which a magnetic head runs, it becomes hard to obtain glass substrates supporting high TPI (100 gigabits/inch square or more), and the object of the invention is not attained. The diameter of the circular hole of each of the glass substrates is preferably within the range of $\pm 2 \times 10^{-4} \times A$ relative to the average circular-hole diameter A.

In manufacturing method 2 of this Embodiment, the obtained glass substrates for a magnetic disk are 2.5-inch substrates, and the diameter of the circular hole of each of the glass substrates is preferably within $A \pm 10$ μm, and more preferably within $A \pm 5$ μm.

Further, the transverse strength of the obtained glass substrate for a magnetic disk is required to be 98 N or more. When the transverse strength is less than 98N, distortion tends to occur in the glass substrate inside a hard disk drive, and the object of the invention is not achieved. The transverse strength is preferably 118 N or more. Meanwhile, the upper limit is not limited particularly, but is normally about 147 N.

[Manufacturing Method 3 of the Glass Substrate for a Magnetic Disk]

Manufacturing method 3 of the glass substrate for a magnetic disk of the invention is a manufacturing method of a glass substrate for a magnetic disk including a chemical reinforcement treatment step of immersing a disk-shaped glass substrate with a circular hole formed at its center portion in a chemical reinforcement treatment solution, causing ion exchange for replacing relatively small ions contained in the surface of the glass substrate with relatively large ions contained in the chemical reinforcement treatment solution, and thereby creating a compressive stress layer in the surface of the glass substrate, and is characterized in that the chemical reinforcement treatment is performed by selecting a glass material of the disk-shaped glass substrate and treatment conditions of the chemical reinforcement treatment so that a deformation amount of the circular hole formed at the center portion of the disk-shaped glass substrate is within 0.05% of the diameter of the circular hole, and that the transverse strength of the glass substrate for a magnetic disk is 98 N or more.

In manufacturing method 3 of this Embodiment, as in manufacturing method 1 described above, each disk-shaped glass substrate with a circular hole formed at its center portion is subjected to chemical reinforcement treatment for creating a compressive stress layer in the glass substrate surface by ion exchange, and the glass substrates for a magnetic disk are thereby manufactured.

Then, when the chemical reinforcement treatment is performed, chemical reinforcement conditions of the chemical reinforcement treatment are selected so that the deformation amount of the circular hole formed at the center portion of the disk-shaped glass substrate is within 0.05% of the diameter of the circular hole, and that the transverse strength of the disk-shaped glass substrate is 98 N or more.

The deformation amount of the circular hole is required to be within 0.05% of the diameter of the circular hole for the same reason as in manufacturing method 1 described above, and is preferably within 0.025%. Further, the transverse strength is required to be 98 N or more for the same reason as in manufacturing method 1 described above, and is preferably 118 N or more. Meanwhile, the upper limit is not limited particularly, but is normally about 147 N.

[Manufacturing Method 4 of the Glass Substrate for a Magnetic Disk]

Manufacturing method 4 of the glass substrate for a magnetic disk of the invention is a manufacturing method of a glass substrate for a magnetic disk including a chemical reinforcement treatment step of immersing a disk-shaped glass substrate with a circular hole formed at its center portion in a chemical reinforcement treatment solution, causing ion exchange for replacing relatively small ions contained in the surface of the glass substrate with relatively large ions contained in the chemical reinforcement treatment solution, and thereby creating a compressive stress layer in the surface of the glass substrate, and is characterized in that a deformation amount due to the chemical reinforcement treatment of the circular hole formed at the center portion of the disk-shaped glass substrate is beforehand grasped for each glass, a glass material is selected so that the deformation amount is within 0.05% of the diameter of the circular hole, and that the transverse strength of the disk-shaped glass substrate due to the chemical reinforcement treatment is 98 N or more, the selected glass material is processed in disk form, while the circular hole is formed at the center portion, and the chemical reinforcement treatment is performed.

In manufacturing method 4 of this Embodiment, as in manufacturing method 1 described above, each disk-shaped glass substrate with a circular hole formed at its center portion is subjected to chemical reinforcement treatment for creating a compressive stress layer in the glass substrate surface by ion exchange, and the glass substrates for a magnetic disk are thereby manufactured.

Then, when the chemical reinforcement treatment is performed, the deformation amount due to the chemical reinforcement treatment of the circular hole formed at the center portion of the disk-shaped glass substrate is beforehand grasped for each glass, the glass material is selected so that the deformation amount is within 0.05% of the diameter of the circular hole, and that the transverse strength of the disk-shaped glass substrate due to the chemical reinforcement treatment is 98 N or more, the selected glass material is processed in disk form, while the circular hole is formed at the center portion, and the chemical reinforcement treatment is performed.

The deformation amount of the circular hole is required to be within 0.05% of the diameter of the circular hole for the same reason as in manufacturing method 1 described above, and is preferably within 0.025%. Further, the transverse strength is required to be 98 N or more for the same reason as in manufacturing method 1 described above, and is preferably 118 N or more. Meanwhile, the upper limit is not limited particularly, but is normally about 147 N.

(Glass for Chemical Reinforcement)

In manufacturing methods 1, 3 and 4 of the glass substrate for a magnetic disk as described above, the same glass as in Embodiment 1 can be used as glass for chemical reinforcement constituting the disk-shaped glass substrate with a circular hole formed at the center portion.

(Chemical Reinforcement Treatment)

In the invention, the chemical reinforcement treatment is performed where disk-shaped glass substrates each with a circular hole formed at its center portion are immersed in a chemical reinforcement treatment solution, relatively small ions contained in the surface of each glass substrate are replaced in ion exchange with relatively large ions contained in the chemical reinforcement treatment solution, and a compressive stress layer is created in the surface of each glass substrate, and the glass substrates for a magnetic disk are thereby manufactured.

When the chemical reinforcement treatment is performed, as described previously, in manufacturing method 1, chemical reinforcement treatment conditions are selected so that the deformation amount of the circular hole formed at the center portion of the disk-shaped glass substrate is within 0.05% of the diameter of the circular hole, and that the transverse strength of the disk-shaped glass substrate is 98 N or more. In manufacturing method 3, the glass material of the disk-shaped glass substrate and chemical reinforcement treatment conditions are selected so that the deformation amount of the circular hole formed at the center portion of the disk-shaped glass substrate is within 0.05% of the diameter of the circular hole, and that the transverse strength of the disk-shaped glass substrate is 98 N or more. In manufacturing method 4, a deformation amount due to the chemical reinforcement treatment of the circular hole formed at the center portion of the disk-shaped glass substrate is beforehand grasped for each glass, a glass material is selected so that the deformation is within 0.05% of the diameter of the circular hole, and that the transverse strength of the disk-shaped glass substrate due to the chemical reinforcement treatment is 98 N or more, the selected glass material is processed in disk form, while the circular hole is formed at the center portion, and the chemical reinforcement treatment is performed.

The chemical reinforcement treatment is not particularly limited, and is capable of being carried out by conventional publicly known methods, for example, subjecting a disk-shaped glass substrate for chemical reinforcement with a circular hole formed at its center to ion exchange in a treatment bath containing Na ions and/or K ions. It is important to perform this treatment at temperatures lower than the deformation point of the glass at which the melting salt does not decompose. The treatment is normally performed at temperatures ranging from 350° C. to 420° C., preferably from 360° C. to 380° C. for 1 to 12 hours, preferably for 2 to 6 hours. As the treatment bath containing Na ions and/or K ions, used preferably is a treatment bath containing sodium nitrate and/or potassium nitrate, but not limited to nitrates, sulfates, bisulfates, carbonates, bicarbonates, halides may be used. When the treatment bath contains Na ions, the Na ions are replaced with Li ions in the glass in ion exchange. Further, when the treatment bath contains K ions, the K ions are replaced with Li ions and Na ions in the glass in ion exchange. Furthermore, the treatment bath contains Na ions and K ions, the Na ions and K ions are respectively replaced with Li ions and Na ions in the glass in ion exchange. By this ion exchange, the alkali metal ions in the glass surface layer portion are replaced with alkali metal ions with a larger ion radius, the compressive stress layer is formed in the glass surface layer portion, and the glass is chemically reinforced. As described above, since the glass substrate for chemical reinforcement used in the invention has excellent ion exchange performance, the compressive stress layer formed by ion exchange is deep, and the thickness ranges generally from about 10 μm to 150 μm, and preferably from 50 μm to 120 μm.

In the glass substrate for a magnetic disk obtained by such a chemical reinforcement treatment, the deformation amount of the circular hole formed at the center portion of the disk-shaped glass substrate is within 0.05% and preferably within 0.025%, the transverse strength of the disk-shaped glass substrate is 98 N or more, and preferably 118 N or more, and the upper limit is about 147 N.

Further, when diameters of circular holes are measured in 500 to 1000 glass substrates that are arbitrarily selected from the glass substrates for a magnetic disk subjected to the above-mentioned chemical reinforcement treatment, the diameter of the circular hole of each of the glass substrates is within the range of $\pm 5 \times 10^{-4} \times A$ relative to the average diameter A of the circular holes of the glass substrates, and is preferably within the range of $\pm 2.5 \times 10^{-4} \times A$.

The glass substrate for a magnetic disk having such properties is capable of supporting disks that a track density of information to record is at least 100-gigabit TPI. Further, the glass substrate for a magnetic disk is capable of supporting a perpendicular magnetic recording system.

The magnetic disk of the invention will be described below.

[Magnetic Disk]

The magnetic disk of the invention is characterized by having at least a magnetic recording layer on the surface of the magnetic-disk glass substrate obtained by any one of manufacturing methods 1 to 4 as described previously.

The magnetic disk of the invention is capable of being manufactured by successively applying generally a backing layer, magnetic recording layer, protective layer and lubrication layer on the magnetic-disk glass substrate obtained by the manufacturing method of the invention.

The magnetic recording layer is not limited particularly, but preferable examples are magnetic recording layers of Co—Cr series, Co—Cr—Pt series, Co—Ni—Cr series, Co—Ni—Pt series, Co—Ni—Cr—Pt series, and Co—Cr—Ta series. Applicable as the backing layer are a Ni layer, Ni—P layer, Cr layer, etc. A carbon film and the like can be used as the protective layer, and to form the lubrication layer, it is possible to use a lubricant of perfluoropolyether, etc.

The glass substrate for a magnetic disk obtained by the method of the invention is particularly suitable for magnetic recording media in the perpendicular magnetic recording system. As a film structure of the magnetic recording layer in magnetic recording media in the perpendicular magnetic recording system, suitable examples are a single-layer film where the perpendicular magnetic recording layer is formed on the glass substrate for a magnetic disk, a two-layer film where a soft magnetic layer and magnetic recording layer are successively laminated, and a three-layer film where a hard magnetic layer, soft magnetic layer and magnetic recording layer are successively laminated. Among the films, the two-layer film and three-layer film are suitable for achieving the high recording density and maintaining stability of magnetic moment, and more preferable than the single-layer film.

EXAMPLES

The invention will more specifically be described below using Examples, but the invention is not limited to the Examples at all. In addition, properties in each Example were measured according to methods as described below.

<Glass for Chemical Reinforcement>

(1) Glass Transition Temperature (Tg) and Yielding Point (Ts)

Measurement was made at a rate of temperature increase of 4° C./min. using a thermomechanical analysis apparatus.

(2) Average Coefficient α of Linear Thermal Expansion

The average coefficient α of linear thermal expansion at 100° C. to 300° C. was measured concurrently with measurement of the glass transition temperature.

(3) Specific Gravity

Measurement was performed on samples of 40 mm×20 mm×15 mm by Archimedes' method.

(4) Refractive Index [nd] and Abbe's Number [vd]

Measurement was performed on the glass cooled at a rate of temperature decrease of 30° C. per hour.

(5) λ80 and λ5

Spectral transmittance was measured on polished samples with a thickness of 10 mm, λ80 was obtained as a wavelength (nm) at which the transmittance is 80%, and λ5 was obtained as a wavelength (nm) at which the transmittance is 5%.

<Glass Substrate for a Magnetic Disk>

Selected arbitrarily were 500 glass substrates for a magnetic disk, the diameter of the circular hole of each of the glass substrates was measured by the following method, and the average diameter A of the circular hole was measured.

Figure 3:
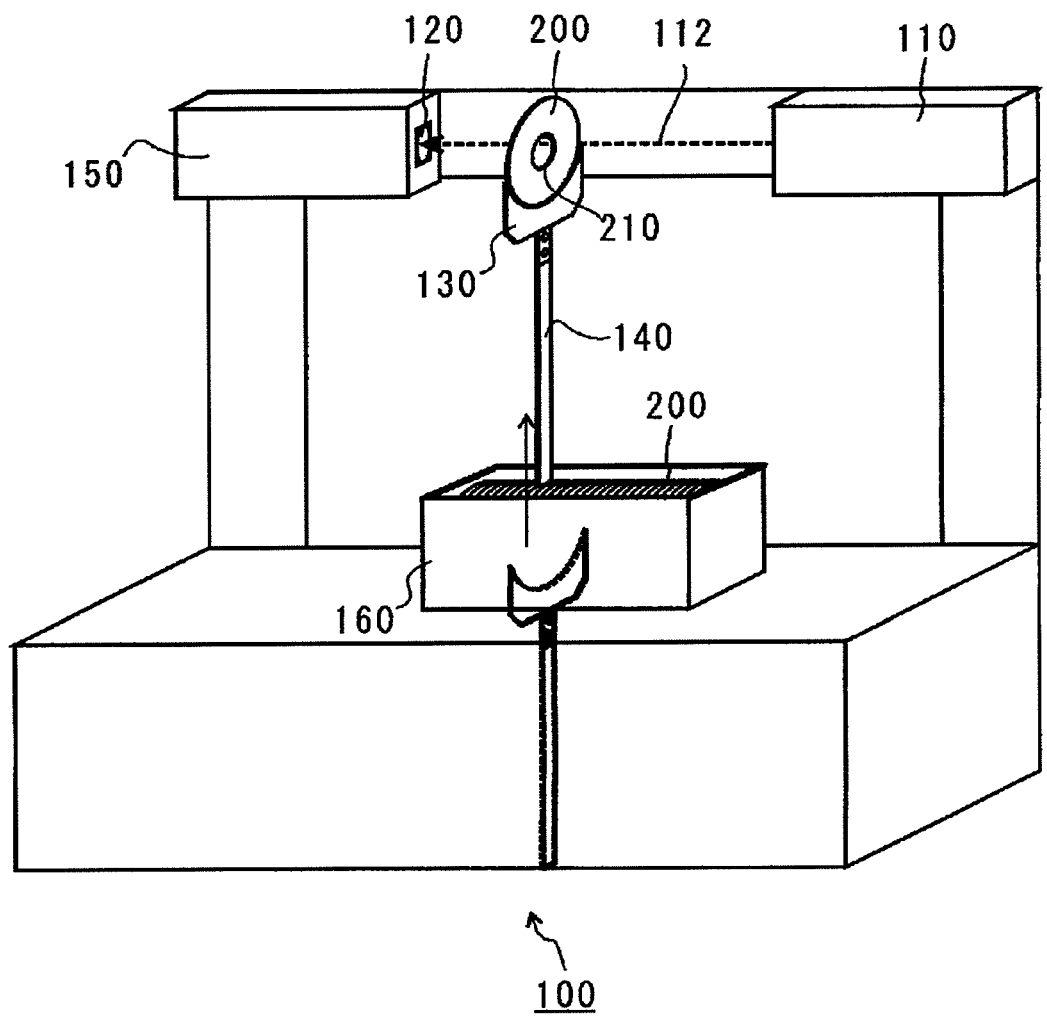
FIG. 3 is a perspective view showing a structure of an inside diameter measurement apparatus for measuring an inside diameter of a glass substrate for a magnetic disk in the invention.

The diameter (inside diameter) of the circular hole of the glass substrate was measured using the inside diameter measurement apparatus as shown in FIG. 3. This inside diameter measurement apparatus will be described below.

FIG. 3 is a perspective view of a laser displacement meter 100 common to all the embodiments of the inside diameter measurement apparatus of the glass substrate according to the invention. The laser displacement meter 100 includes a line laser light source 110 for emitting line laser 112 that is line light, a substrate holder 130 for supporting a glass substrate 200 with a circular hole 210 formed at the center, a holder lifting/lowering portion 140 for lifting and lowering the substrate holder 130 so that the line laser 112 is passed through the circular hole 210 of the glass substrate 200, a light receiving portion 120 for receiving the passed line laser 112 during lifting and lowering, an inside diameter measuring portion 150 for measuring the inside diameter of the circular hole 210 based on the line laser 112 received in the light receiving portion 120, and a cassette 160 for storing a plurality of glass substrates 200.

Then, the holder lifting/lowering portion 140 lifts and lowers the glass substrate 200. The line laser 112 is emitted to the lifted/lowered glass substrate 200. At this point, the light receiving portion 120 measures the distance of the circular hole 210 based on the received line laser 112. Then, among measured distances, the maximum value is regarded as the inside diameter of the glass substrate 200. In this way, the inside diameter of the glass substrate 200 is measured.

(7) Transverse Strength of the Glass Substrate

Figure 4:
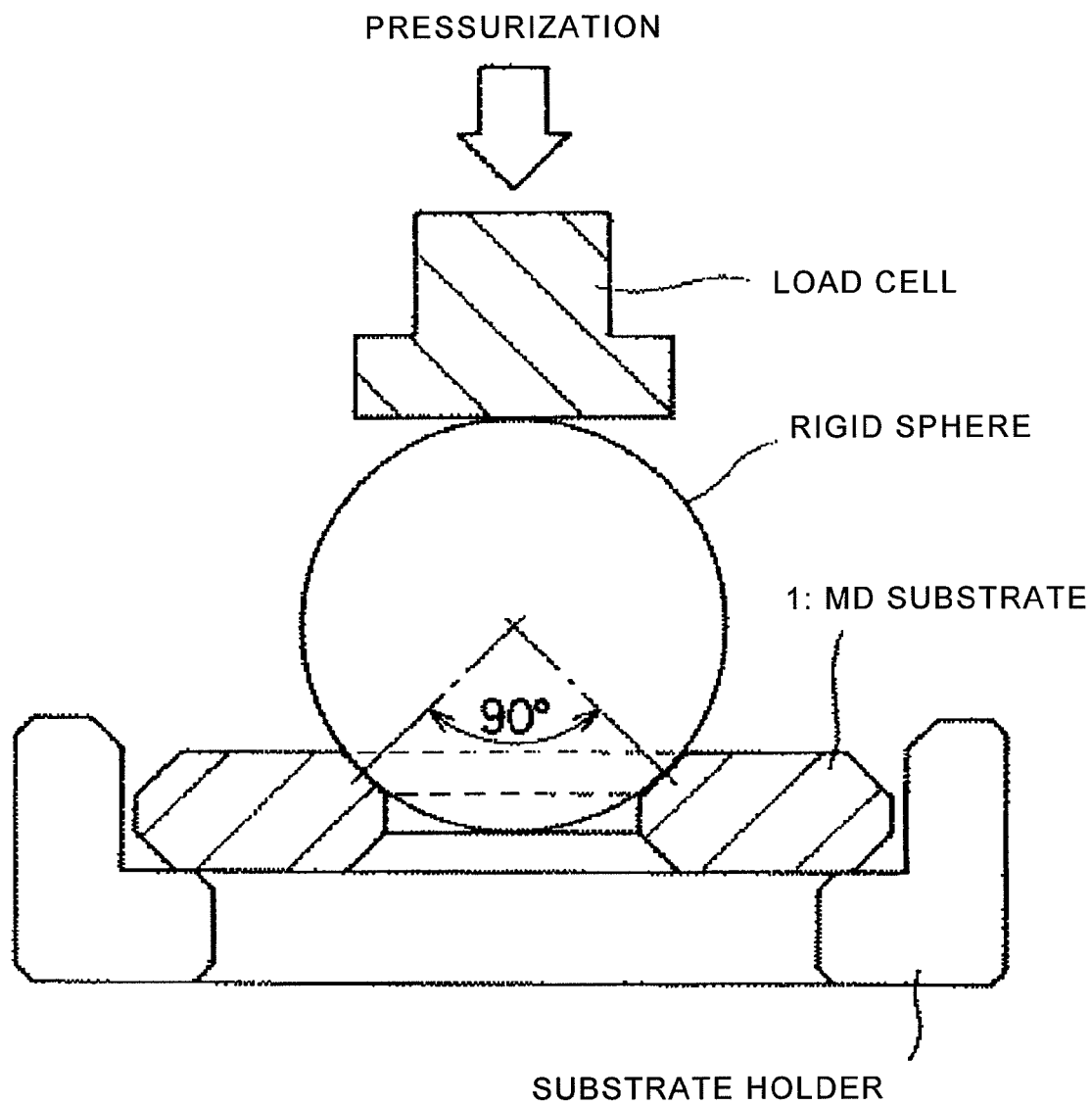
FIG. 4 is view showing a schematic structure of a transverse strength tester for measuring the transverse strength of the glass substrate for a magnetic disk in the invention.

The transverse strength of the glass substrate was measured using a transverse strength tester (SHIMAZU Auto Graph DDS-2000) as shown in FIG. 4. More specifically, loads were added onto the glass substrate, and the transverse strength was obtained as a load when the glass substrate was broken.

(8) Thickness of the Compressive Stress Layer

The section of the glass substrate for a magnetic disk was polished, and the thickness of the compressive stress layer was measured using a polarization microscope.

Examples 1 to 6 and Comparative Example 1

Using quartzite powder, aluminum hydroxide, alumina, lithium carbonate, sodium carbonate, potassium carbonate, magnesium carbonate, calcium carbonate, zirconium dioxide, ion oxide, etc. to obtain the oxide composition as shown in Table 1, a mixture of about 2 kg was prepared, melted and clarified in a platinum pot at 1450° C. to 1550° C., cast in an iron die and annealed, and glass for chemical reinforcement was thus prepared. The physical properties are shown in Table 1.

Next, using each glass for chemical reinforcement as described above, prepared were 150 doughnut-shaped 2.5-inch disk shaped glass substrates each having a circular hole with a diameter of 20 mm at the center. Specific descriptions are given below.

(1) Form Processing Step

The glass with the composition described in each of Examples 1 to 6 was formed by a direct press method, and made as amorphous disk-shaped glass substrates. Then, a hole was made at the center portion of each glass substrate using a grinder, and disk-shaped glass substrates each having a circular hole at the center portion were prepared. Further, chamfering processing was performed on the outer circumferential end face and inner circumferential end face.

(2) End Face Polishing Step

Subsequently, while rotating the glass substrate, polishing was performed by brush polishing so that the surface roughness of the end face (outer circumference and inner circumference) of the glass substrate was about 1.0 μm in the maximum height (Rmax) and about 0.3 μm in arithmetic average roughness (Ra).

(3) Grinding Step

Next, using abrasive grains with grading of #1000, the glass substrate surface was ground so that the flatness degree of the main surface was 3 μm, Rmax was about 2 μm, and that Ra was about 0.2 μm. Herein, the flatness degree is a distance (height difference) in the vertical direction (perpendicular direction to the surface) between the highest portion and the lowest portion on the substrate surface, and was measured by a flatness-degree measurement instrument. Further, For Rmax and Ra, rectangular regions of 5 μm×5 μm were measured by an atomic force microscope (AFM) (Digital Instruments Nanoscope).

(4) Preliminary Polishing Step

Subsequently, the preliminary polishing step was carried out using a polishing apparatus capable of polishing both main surfaces of 100 to 200 glass substrates once. A hard polisher was used as a polishing pad. Zirconium dioxide and cerium dioxide were beforehand contained in the polishing pad, and the pad was used.

The polishing solution in the preliminary polishing step was prepared by mixing cerium dioxide polishing grains with an average grain diameter of 1.1 μm into water. In addition, the polishing grains with the grain diameter exceeding 4 μm were beforehand removed. When the polishing solution was measured, the maximum value of the polishing grains contained in the polishing solution was 3.5 μm, the average value was 1.1 μm, and D50 value was 1.1 μm.

Moreover, the load added to the glass substrate was 784 to 980 mN/cm$^2$, and the removal thickness of the surface portion of the glass substrate was 20 μm to 40 μm.

(5) Mirror Finish Polishing Step

The mirror finish polishing step was carried out using a planetary gear type polishing apparatus capable of polishing both main surfaces of 100 to 200 glass substrates once. A soft polisher was used as a polishing pad.

The polishing solution in the mirror finish polishing step was prepared by adding sulfuric acid and tartaric acid to ultrapure water, and further adding colloidal silica particles with a grain diameter of 40 nm. At this point, the concentration of sulfuric acid in the polishing solution was 0.15 percent by mass, and the pH value of the polishing solution was kept at 2.0 or less. Further, the concentration of tartaric acid was 0.8 percent by mass, and the content of colloidal silica particles was 10 percent by mass.

In addition, in the mirror finish polishing processing, the pH value of the polishing solution did not fluctuate, and was kept substantially constant. In the Examples, the polishing solution supplied to the surface of the glass substrate was recovered using a drain, clarified by removing contamination using a mesh-shaped filter, then supplied again to the glass substrate, and thus reused.

The polishing processing rate in the mirror finish step was 0.25 µm/min. and it was understood that the above-mentioned conditions enable the advantageous polishing processing rate to be achieved. In addition, the polishing processing rate was obtained by dividing a reduction amount (processing removal amount) in the thickness of the glass substrate required to finish a predetermined mirror surface by the required polishing processing time.

(6) Washing Step After the Mirror Finish Polishing Processing

Subsequently, the glass substrates were immersed in NaOH aqueous solution with the concentration ranging from 3 percent to 5 percent by mass to perform alkali cleaning. In addition, the cleaning was performed while applying ultrasonic waves. Further, the glass substrates were immersed sequentially in washing tanks respectively of a natural detergent, pure water, pure water, isopropyl alcohol and isopropyl alcohol (steam dry) and washed. When the surfaces of washed glass substrates were measured by AFM (Digital Instruments Nanoscope) (rectangular regions of 5 µm×5 µm were measured), any adhesion of colloidal silica polishing grains was not observed. Further, contamination of stainless, iron, etc. was not found. Furthermore, any increase in roughness of the substrate surface was not recognized between before and after washing.

(7) Chemical Reinforcement Treatment Step

Next, the chemical reinforcement treatment was performed by immersing the washed glass substrates pre-heated to 300° C. for about 4 hours in a chemical reinforcement salt obtained by mixing potassium nitrate (60 percent by mass) and sodium nitrate (40 percent by mass) and heating to 375° C. By this treatment, lithium ions and sodium ions in the surface of the glass substrate were respectively replaced with sodium ions and potassium ions in the chemical reinforcement salt, and the glass substrate was chemically reinforced. In addition, the thicknesses of the compressive stress layers formed in the surfaces of the glass substrates ranged from about 100 µm to 150 µm. After implementing the chemical reinforcement, the glass substrates were immersed in a water tank of 20° C. for quenching, and kept for about 10 minutes.

(8) Washing Step After Chemical Reinforcement

Subsequently, the quenched glass substrates were immersed in sulfuric acid heated to about 40° C. and washed while applying ultrasonic waves. Then, the glass substrates were washed using 0.5% (percent by volume) hydrofluorosilicic acid ($H_2SiF_6$) aqueous solution, and then, further washed using 1 percent by mass of potassium hydroxide aqueous solution. Then, manufacturing of the glass substrate for a magnetic disk was completed.

(9) Inspection Step of the Glass Substrate for a Magnetic Disk

Next, inspection was performed on the glass substrates for a magnetic disk. Roughness of the surfaces of the glass substrates for a magnetic disk was measured using AFM (atomic force microscope) (rectangular regions of 5 µm×5 µm were measured), and the maximum peak height (Rmax) was 1.5 nm, while arithmetic average roughness (Ra) was 0.15 nm. Further, the surfaces were in cleaned mirror finished surface state, and there was neither a foreign substance for preventing flying of a magnetic head nor contamination becoming a cause of thermal asperity trouble. Furthermore, any increase in roughness of the substrate surface was not found between before and after washing.

In addition, in the aforementioned description, acid cleaning and alkali cleaning was performed after chemical reinforcement, but acid cleaning and alkali cleaning may be performed in washing after the mirror finish polishing step.

Further, for the glass substrates for a magnetic disk of each Example, the average diameter A of the circular hole was obtained, while a rate (%) of circular-hole diameters of glass substrates departing from the range of $\pm 5 \times 10^{-4} \times A$ relative to the average diameter A of the circular hole was obtained. Obtained furthermore were the average thickness of compressive stress layer and average transverse strength of glass substrates for a magnetic disk of each Example. Their results are shown in Table 1.

TABLE 1

| | | | Example | | | | | | Comparative Example |
|---|---|---|---|---|---|---|---|---|---|
| | | | 1 | 2 | 3 | 4 | 5 | 6 | 1 |
| Glass for chemical reinforcement | Glass composition (mass %) | $SiO_2$ | 65.08 | 65.10 | 66.75 | 65.32 | 64.56 | 65.20 | 63.3 |
| | | $Al_2O_3$ | 15.14 | 15.14 | 15.30 | 16.84 | 15.02 | | 14.0 |
| | | $Al_2O_3$ (H) | | | | | | 15.14 | |
| | | $Li_2O$ (C) | 3.61 | 3.86 | 3.90 | 3.87 | 2.89 | 3.86 | 6.00 |
| | | $Na_2O$ (C) | 10.68 | 11.18 | 11.29 | 11.22 | 12.08 | 11.18 | 10.40 |
| | | $K_2O$ (N) | 0.35 | 0.35 | 0.35 | 0.35 | 0.35 | 0.35 | |
| | | MgO | 0.99 | 0.67 | 0.67 | 0.67 | 0.98 | 0.67 | 0.30 |
| | | CaO (C) | 2.07 | 1.62 | 1.64 | 1.63 | 2.06 | 1.62 | |
| | | $ZrO_2$ | 1.98 | 1.98 | | | 1.96 | 1.98 | 6.0 |
| | | $Fe_2O_3$ | 0.10 | 0.10 | 0.10 | 0.10 | 0.10 | | |
| | | Total | 100.00 | 100.00 | 100.00 | 100.00 | 100.00 | 100.00 | 100.00 |
| | Specific gravity | | 2.47 | 2.47 | 2.44 | 2.44 | 2.47 | 2.47 | 2.51 |
| | Tg (° C.) | | 510 | 502 | 492 | 494 | 513 | 499 | 500 |
| | Ts (° C.) | | 572 | 578 | 550 | 570 | 594 | 572 | 561 |
| | $\alpha$ (×10-7/° C.) | | 92 | 92 | 94 | 93 | 93 | 92 | 91 |
| | nd | | 1.52024 | 1.51974 | 1.51399 | 1.51428 | 1.51828 | 1.52003 | 1.533 |
| | vd | | 59.66 | 59.6 | 60.47 | 60.50 | 59.57 | 59.64 | 57.9 |
| | λ80 (nm) | | 360 | 360 | 358 | 359 | 360 | 342 | 330 |
| | 5 (nm) | | 325 | 325 | 324 | 324 | 325 | 305 | 292 |

TABLE 1-continued

| | | Example | | | | | | Comparative Example |
|---|---|---|---|---|---|---|---|---|
| | | 1 | 2 | 3 | 4 | 5 | 6 | 1 |
| Glass substrate for magnetic disk | Average circular-hole diameter A (mm) | 20.010 | 20.011 | 20.010 | 20.009 | 20.010 | 20.011 | 20.011 |
| | Rate (%) of departing from $\pm 5 \times 10^{-4} \times A$ | 2 | 0 | 2 | 3 | 2 | 4 | 15 |
| | Average thickness of average compressive stress (μm) | 120 | 120 | 110 | 110 | 120 | 120 | 150 |
| | Average transverse strength (N) | 147 | 157 | 118 | 127 | 157 | 147 | 167 |

(Note)
In the glass composition, (H), (C) and (N) represent hydroxide, carbonate and nitrate as raw materials, respectively.

Figure 5:
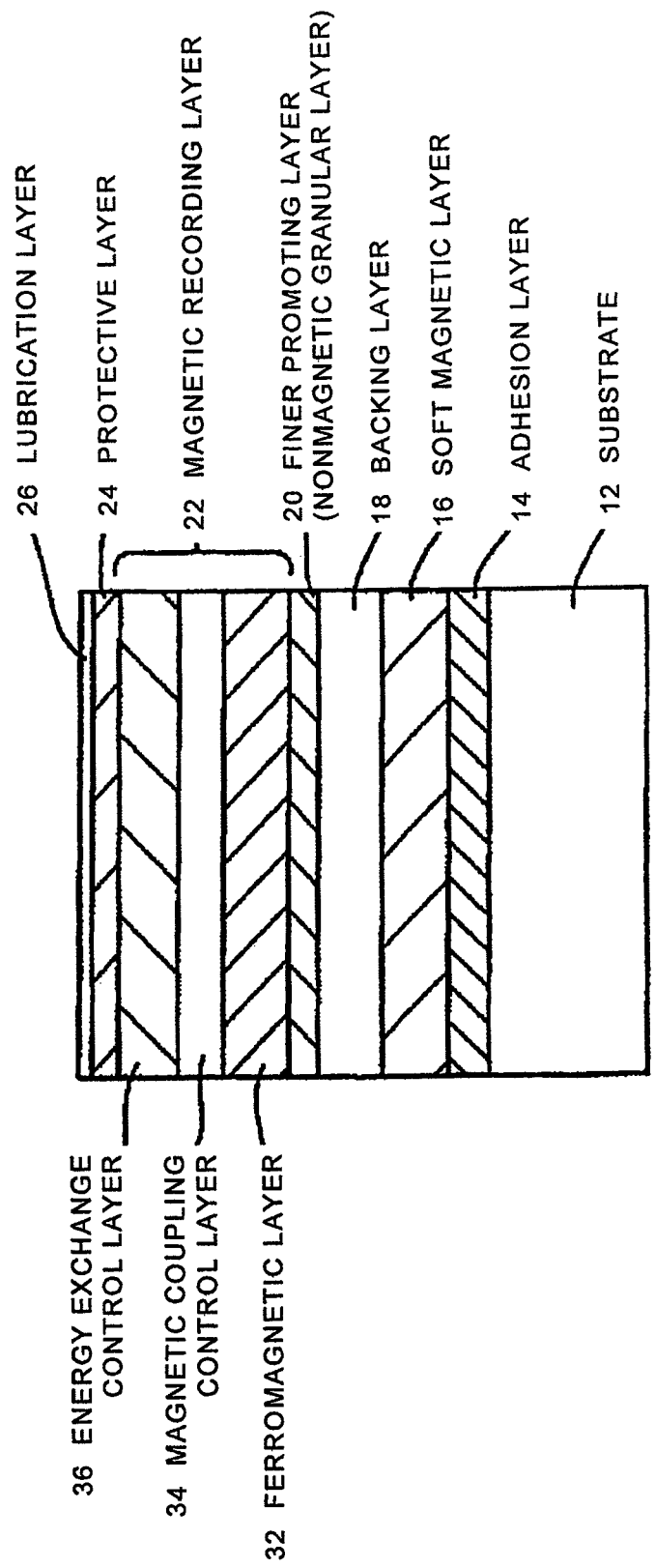
FIG. 5 is a diagram showing an example of a configuration of a magnetic disk according to one embodiment of the invention.

Next, using the glass substrates for a magnetic disk prepared in Example 1, magnetic disks were prepared as described below, and tests were performed in a hard disk drive. FIG. 5 schematically shows a film structure (cross section) on the substrate 12.

First, using a deposition apparatus under vacuum, an adhesion layer 14 and soft magnetic layer 16 were successively deposited in an atmosphere of Ar by a DC magnetron sputtering method.

At this point, the adhesion layer 14 was deposited using a CrTi target so that the layer 14 was an amorphous CrTi layer of 20 nm. Further, the soft magnetic layer 16 was deposited using a CoTaZr target so that the layer 16 was an amorphous CoTaZr (Co: 88 at %, Ta: 7 at %: Zr: 5 at %) layer of 200 nm.

The magnetic disk 10 subjected to deposition up to the soft magnetic layer 16 was removed from the deposition apparatus, and when surface roughness was similarly measured, a smooth mirror finished surface was obtained with Rmax of 2.1 nm and Ra of 0.20 nm. When magnetic properties were measured using VSM (vibrating sample magnetization meter), the coercive force (Hc) was 2 Oe, the saturation magnetic flux density was 810 emu/cc, and suitable soft magnetic properties were shown.

Next, using a sheet/static opposite deposition apparatus, in an atmosphere of Ar, deposited successively were a backing layer 18, finer promoting layer 20 of granular structure, ferromagnetic layer 23 of granular structure, magnetic coupling control layer 34, exchange energy control layer 36, and protective layer 24. In the Examples, the backing layer 18 was a two-layer structure having the first layer and second layer.

In this step, first, on the disk substrate were formed a layer with a thickness of 10 nm formed of amorphous NiTa (Ni: 40 at %, Ta: 10 at %) as the first layer of the backing layer 18, and a Ru layer with a thickness ranging from 10 to 15 nm as the second layer.

Next, using a target formed of nonmagnetic CoCr—SiO$_2$, formed was the finer promoting layer 20 formed of hcp crystal structure with 2 to 20 nm. Further, using a target of hard magnetic material formed of CoCrPt—SiO$_2$, formed was the ferromagnetic layer 32 formed of hcp crystal structure with 15 nm. The target composition for preparing the ferromagnetic layer 32 was Co: 62 at %, Cr: 10 at %, Pt: 16 at %, and Si: 12 at %. Further, the magnetic coupling control layer 34 made of a Pd layer was formed, and the energy exchange control layer 36 made of a [CoB/Pd]n layer was formed.

Subsequently, by a CVD method using ethylene as a material gas, formed was the protective layer 24 made of carbon hydride. By using carbon hydride, the film hardness is increased, and it is possible to protect the magnetic recording layer 22 against impact from the magnetic head.

Thereafter, the lubrication layer 26 made of PFPE (perfluoropolyether) was formed by a dip coating method. The thickness of the lubrication layer 26 was 1 nm. By the manufacturing steps as described above, the perpendicular magnetic recording type magnetic disks 10 were obtained that are perpendicular magnetic recording media. When obtained surface roughness was measured in the same way as described above, Rmax was 2.2 nm, Ra was 0.21 nm, and thus a smooth mirror finished surface was obtained.

The obtained magnetic disk 10 was installed in a 2.5-inch load/unload type hard disk drive. The magnetic head installed in the hard disk drive is a Dynamic Flying Height (abbreviated as DFH) type magnetic head. A flying height of the magnetic head with respect to the magnetic disk is 8 nm.

When recording/reproduction tests were performed on a recoding/reproduction region on the main surface of the magnetic disk by the hard disk drive in a recording density of 200 gigabits/square inch, excellent recording/reproduction properties were exhibited. Further, during the tests, neither crush trouble nor thermal asperity trouble occurred.

Next, Load Unload (hereinafter, LUL) tests were performed using a hard disk drive.

The LUL tests were performed using a 2.5-inch hard disk drive rotating at 5400 rpm and a magnetic head with a flying height of 8 nm. The same magnetic head as described above was used. A shield portion was made of NiFe alloy. This magnetic disk was installed in the magnetic disk apparatus, the LUL operation was performed continuously with the above-mentioned magnetic head, and the number of LUL endurance times was measured.

After the LUL endurance test, the surface of the magnetic disk and the surface of the magnetic head were observed by unaided eye and light microscope to check the presence or absence of abnormality such as a flaw and stain. For the LUL endurance test, it is required to endure 400,000 LUL times or more without failure, and particularly, it is suitable to endure 600,000 LUL times or more. In addition, in use environments of normally used HDD (Hard Disk Drive), it is said that use of almost ten years is required for the number of LUL times to exceed 600,000.

When the LUL tests were performed, the magnetic disks 10 endured 600,000 times or more and passed the test. Further, the magnetic disks 10 were removed after the LUL test and inspected, and any abnormality such as a flaw and stain was not detected. Further, deposition of the alkali metal component was not noticed.

The present invention is not limited to above-mentioned Embodiments, and is capable of being carried into practice with various modifications thereof. The above-mentioned Embodiments 1 and 2 are capable of being carried into practice in a combination thereof as appropriate. Further, the numbers of members, sizes, processing procedures and others in the above-mentioned Embodiments are of examples, and are capable of being carried into practice with various modifications thereof within the scope of exhibiting the effects of the invention. Moreover, the Embodiments are capable of being carried into practice with modifications as appropriate without departing from the scope of the object of the invention.

The invention claimed is:

1. A method of manufacturing a glass substrate for a magnetic disk,
wherein the glass contains in expression of percent by mass:
SiO$_2$ 57 to 75%;
Al$_2$O$_3$ 5 to 20%;
(where the total amount of SiO$_2$+Al$_2$O$_3$ is 74% or more)
the total of ZrO$_2$, HfO$_2$, Nb$_2$O$_5$, Ta$_2$O$_5$, La$_2$O$_3$, Y$_2$O$_3$, and TiO$_2$ exceeding 0% to 6% or less;
Li$_2$O exceeding 1% to 9% or less;
Na$_2$O 5 to 18%;
(where the mass ratio Li$_2$O/Na$_2$O is 0.5 or less)
K$_2$O 0 to 6%;
MgO 0 to 4%;
CaO exceeding 0% to 5% or less;
(where the total amount of MgO and CaO is 5% or less, and the content of CaO is higher than the content of MgO) and
SrO+BaO 0 to 3%,
the method comprising the step of applying chemical reinforcement treatment to the glass substrate,
wherein a glass composition of the glass substrate and conditions of the chemical reinforcement treatment are selected to perform the chemical reinforcement treatment on the selected conditions so that when the glass substrate for a magnetic disk is made by the chemical reinforcement treatment, a penetration length in an uppermost-portion stress layer on a main surface of the glass substrate for a magnetic disk is 49.1 μm or less, and that assuming that an angle between the main surface and compressive stress in a stress profile by a Babinet compensator method is θ, the penetration length in the uppermost-portion stress layer is a value y of $\{12 \cdot t \cdot \ln(\tan \theta) + (49.1/t)\}$ or less,
the penetration length in the uppermost-portion stress layer is a length of the longer diagonal in an indentation when a diamond quadrangular pyramid indenter of rhombic transverse section with vertex angles of 172° 30' and 130° is pressed against the main surface with a pressing force of 100 g, the tan θ is a value $\{(L_1+L_2)/(P_1+P_2)\}$ calculated from stress values and stress depths obtained by the Babinet compensator method, the t is a thickness of the substrate,
P$_1$ is a compressive stress value, P$_2$ is a tensile stress value, L$_1$ is a compressive stress depth, and L$_2$ is a tensile stress depth.

2. The manufacturing method of a glass substrate for a magnetic disk according to claim 1, wherein the value of y is $\{16 \cdot t \cdot \ln(\tan \theta) + (49.1/t)\}$.

3. The manufacturing method of a glass substrate for a magnetic disk according to claim 1, wherein glass forming the glass substrate for a magnetic disk is aluminosilicate glass containing Zr.

4. A method of manufacturing a glass substrate for a magnetic disk, wherein the glass contains in expression of percent by mass:
SiO$_2$ 57 to 75%;
Al$_2$O$_3$ 5 to 20%;
(where the total amount of SiO$_2$+Al$_2$O$_3$ is 74% or more)
the total of ZrO$_2$, HfO$_2$, Nb$_2$O$_5$, Ta$_2$O$_5$, La$_2$O$_3$, Y$_2$O$_3$, and TiO$_2$ exceeding 0% to 6% or less;
Li$_2$O exceeding 1% to 9% or less;
Na$_2$O 5 to 18%;
where the mass ratio Li$_2$O/Na$_2$O is 0.5 or less,
K$_2$O 0 to 6%;
MgO 0 to 4%;
CaO exceeding 0% to 5% or less;
where the total amount of MgO and CaO is 5% or less, and the content of CaO is higher than the content of MgO, and
SrO+BaO 0 to 3%,
said method comprising:
a chemical reinforcement treatment step of immersing a disk-shaped glass substrate, having a circular hole formed at a center portion thereof and made from said glass, in a chemical reinforcement treatment solution, causing ion exchange for replacing relatively small ions contained in a surface of the glass substrate made from said glass with relatively large ions contained in the chemical reinforcement treatment solution, and thereby creating a compressive stress layer in the surface of the glass substrate,
wherein the chemical reinforcement treatment is performed so that a deformation amount of the circular hole formed at the center portion of the disk-shaped glass substrate is within 0.05% of the diameter of the circular hole, and that the transverse strength of the disk-shaped glass substrate is 98 N or more.

5. A method of manufacturing a glass substrate for a magnetic disk, wherein the glass contains in expression of percent by mass:
SiO$_2$ 57 to 75%;
Al$_2$O$_3$ 5 to 20%;
(where the total amount of SiO$_2$+Al$_2$O$_3$ is 74% or more)
the total of ZrO$_2$, HfO$_2$, Nb$_2$O$_5$, Ta$_2$O$_5$, La$_2$O$_3$, Y$_2$O$_3$, and TiO$_2$ exceeding 0% to 6% or less;
Li$_2$O exceeding 1% to 9% or less;
Na$_2$O 5 to 18%;
where the mass ratio Li$_2$O/Na$_2$O is 0.5 or less,
K$_2$O 0 to 6%;
MgO 0 to 4%;
CaO exceeding 0% to 5% or less;
where the total amount of MgO and CaO is 5% or less, and the content of CaO is higher than the content of MgO, and
SrO+BaO 0 to 3%,
wherein the glass substrate is a doughnut-shaped glass substrate for a magnetic disk, and has a circular hole at a center portion thereof, and
wherein when diameters of circular holes of 500 to 1000 glass substrates that are arbitrarily selected are measured, the diameter of the circular hole of each of the glass substrates is within the range of $\pm 5 \times 10^{-4} \times A$ relative to the average diameter A of the circular holes of the glass substrates, the transverse strength of each of the glass substrates is 98 N or more, and control is thus performed.

6. The manufacturing method of a glass substrate for a magnetic disk according to claim 5, wherein the glass substrate for a magnetic disk is a 2.5-inch substrate, and the diameter of the circular hole of each glass substrate is within A±10 μm.

7. A method of manufacturing a glass substrate for a magnetic disk, wherein a glass material in said substrate contains in expression of percent by mass:

SiO$_2$ 57 to 75%;
Al$_2$O$_3$ 5 to 20%;
where the total amount of SiO$_2$+Al$_2$O$_3$ is 74% or more,
the total of ZrO$_2$, HfO$_2$, Nb$_2$O$_5$, Ta$_2$O$_5$, La$_2$O$_3$, Y$_2$O$_3$, and TiO$_2$ exceeding 0% to 6% or less;
Li$_2$O exceeding 1% to 9% or less;
Na$_2$O 5 to 18%;
where the mass ratio Li$_2$O/Na$_2$O is 0.5 or less,
K$_2$O 0 to 6%;
MgO 0 to 4%;
CaO exceeding 0% to 5% or less;
where the total amount of MgO and CaO is 5% or less, and the content of CaO is higher than the content of MgO, and
SrO+BaO 0 to 3%,
said method comprising:
a chemical reinforcement treatment step of immersing a disk-shaped glass substrate with, having a circular hole formed at a center portion thereof and made from said glass material, in a chemical reinforcement treatment solution, causing ion exchange for replacing relatively small ions contained in a surface of the glass substrate made from said glass material with relatively large ions contained in the chemical reinforcement treatment solution, and thereby creating a compressive stress layer in the surface of the glass substrate,
wherein the chemical reinforcement treatment is performed by selecting said glass material of the disk-shaped glass substrate and treatment conditions of the chemical reinforcement treatment so that a deformation amount of the circular hole formed at the center portion of the disk-shaped glass substrate is within 0.05% of the diameter of the circular hole, and that the transverse strength of the disk-shaped glass substrate is 98 N or more.

8. A method of manufacturing a glass substrate for a magnetic disk, wherein a glass material in said substrate contains in expression of percent by mass:
SiO$_2$ 57 to 75%;
Al$_2$O$_3$ 5 to 20%;
where the total amount of SiO$_2$+Al$_2$O$_3$ is 74% or more,
the total of ZrO$_2$, HfO$_2$, Nb$_2$O$_5$, Ta$_2$O$_5$, La$_2$O$_3$, Y$_2$O$_3$, and TiO$_2$ exceeding 0% to 6% or less;
Li$_2$O exceeding 1% to 9% or less;
Na$_2$O 5 to 18%;
where the mass ratio Li$_2$O/Na$_2$O is 0.5 or less,
K$_2$O 0 to 6%;
MgO 0 to 4%;
CaO exceeding 0% to 5% or less;
where the total amount of MgO and CaO is 5% or less, and the content of CaO is higher than the content of MgO, and
SrO+BaO 0 to 3%,
said method comprising:
a chemical reinforcement treatment step of immersing a disk-shaped glass substrate, having a circular hole formed at a center portion thereof and made from said glass material, in a chemical reinforcement treatment solution, causing ion exchange for replacing relatively small ions contained in a surface of the glass substrate made from said glass material with relatively large ions contained in the chemical reinforcement treatment solution, and thereby creating a compressive stress layer in the surface of the glass substrate,
wherein a deformation amount due to the chemical reinforcement treatment of the circular hole formed at the center portion of the disk-shaped glass substrate is beforehand grasped for each glass, said glass material is selected so that the deformation amount is within 0.05% of the diameter of the circular hole, and that the transverse strength of the disk-shaped glass substrate due to the chemical reinforcement treatment is 98 N or more, the selected glass material is processed in disk form, while the circular hole is formed at the center portion, and the chemical reinforcement treatment is performed.

9. The manufacturing method of a glass substrate for a magnetic disk according to claim 4, wherein the chemical reinforcement treatment is performed using a chemical reinforcement treatment solution having a composition with 60 percent to 80 percent by mass KNO$_3$ and 40 percent to 20 percent by mass NaNO$_3$, where 100 percent by mass in total, at a temperature ranging from 350° C. to 420° C.

10. The manufacturing method of a glass substrate for a magnetic disk according to claim 4, wherein a thickness of the compressive stress layer in the disk-shaped glass substrate subjected to the chemical reinforcement treatment ranges from 10 μm to 150 μm.

11. The manufacturing method of a glass substrate for a magnetic disk according to claim 4, wherein the glass substrate supports a magnetic disk in which a track density of information to record is at least 100-gigabit TPI.

12. The manufacturing method of a glass substrate for a magnetic disk according to claim 4, wherein the glass substrate supports a perpendicular magnetic recording system.

13. The manufacturing method of a glass substrate for a magnetic disk according to claim 1, wherein a compressive stress depth is from 100 μm to 150 μm.

14. The manufacturing method of a glass substrate for a magnetic disk according to claim 4, wherein the mass ratio Li$_2$O/Na$_2$O is 0.38 or less.

15. The manufacturing method of a glass substrate for a magnetic disk according to claim 5, wherein the mass ratio Li$_2$O/Na$_2$O is 0.38 or less.

16. The manufacturing method of a glass substrate for a magnetic disk according to claim 7, wherein the mass ratio Li$_2$O/Na$_2$O is 0.38 or less.

17. The manufacturing method of a glass substrate for a magnetic disk according to claim 8, wherein the mass ratio Li$_2$O/Na$_2$O is 0.38 or less.

* * * * *